United States Patent [19]
Kaneko

[11] Patent Number: 5,826,116
[45] Date of Patent: Oct. 20, 1998

[54] CAMERA CAPABLE OF REMOTE-CONTROL OPERATION

[75] Inventor: Yoshiyuki Kaneko, Kanagawa-ken, Japan

[73] Assignee: Canon Kabushiki Kaisha, Tokyo, Japan

[21] Appl. No.: 370,543

[22] Filed: Jan. 9, 1995

Related U.S. Application Data

[63] Continuation of Ser. No. 326,051, Oct. 19, 1994, abandoned, which is a continuation of Ser. No. 159,933, Nov. 30, 1993, abandoned, which is a continuation of Ser. No. 908,428, Jun. 30, 1992, abandoned, which is a continuation of Ser. No. 485,377, Feb. 26, 1990, abandoned.

[51] Int. Cl.$^6$ .................................................. G03B 17/20
[52] U.S. Cl. ............................................. 396/56; 396/58
[58] Field of Search .......................... 354/195.1, 195.12, 354/195.13, 266, 289.11, 289.12, 127.11, 465; 396/56–59, 72, 88, 281, 287

[56] References Cited

U.S. PATENT DOCUMENTS

| | | |
|---|---|---|
| 3,883,883 | 5/1975 | Sano et al. ................................. 354/75 |
| 4,043,642 | 8/1977 | Hirose et al. ...................... 354/195.1 X |
| 4,142,786 | 3/1979 | Suzuki et al. ............................. 354/413 |
| 4,318,602 | 3/1982 | Yamanaka et al. ................. 354/127.11 |
| 4,586,029 | 4/1986 | Tamura et al. ....................... 354/465 X |
| 4,855,782 | 8/1989 | Kobayashi et al. ............ 354/195.13 X |
| 4,857,951 | 8/1989 | Nakajima et al. ................... 354/195.1 |
| 4,884,094 | 11/1989 | Kitaura et al. ........................... 354/412 |

FOREIGN PATENT DOCUMENTS

| | | | |
|---|---|---|---|
| 56149158 | 3/1983 | Japan ..................................... 354/266 |

*Primary Examiner*—Howard B. Blankenship
*Attorney, Agent, or Firm*—Robin, Blecker & Daley

[57] ABSTRACT

A camera capable of remote-control operations comprises a receiver for receiving a remote-control signal and a magnification alterer for altering a magnification optical system into a predetermined magnification in response to receipt by the receiver of the remote-control signal. The alterer alters the magnification state of the magnification optical system until the optical system reaches the predetermined magnification state beyond a magnification state accessible by the optical system at the time at which the receiver stops receiving the remote-control signal.

29 Claims, 30 Drawing Sheets

| ZM4 | ZM3 | ZM2 | ZM1 | N | f(mm) |
|---|---|---|---|---|---|
| ON | ON | ON | ON | 1 | 38 |
| ON | ON | ON | OFF | 2 | 41 |
| ON | ON | OFF | OFF | 3 | 43 |
| ON | ON | OFF | ON | 4 | 46 |
| ON | OFF | OFF | ON | 5 | 50 |
| ON | OFF | OFF | OFF | 6 | 53 |
| ON | OFF | ON | OFF | 7 | 57 |
| ON | OFF | ON | ON | 8 | 61 |
| OFF | OFF | ON | ON | 9 | 65 |
| OFF | OFF | ON | OFF | 10 | 70 |
| OFF | OFF | OFF | OFF | 11 | 74 |
| OFF | OFF | OFF | ON | 12 | 79 |
| OFF | ON | OFF | ON | 13 | 85 |

FIG.5

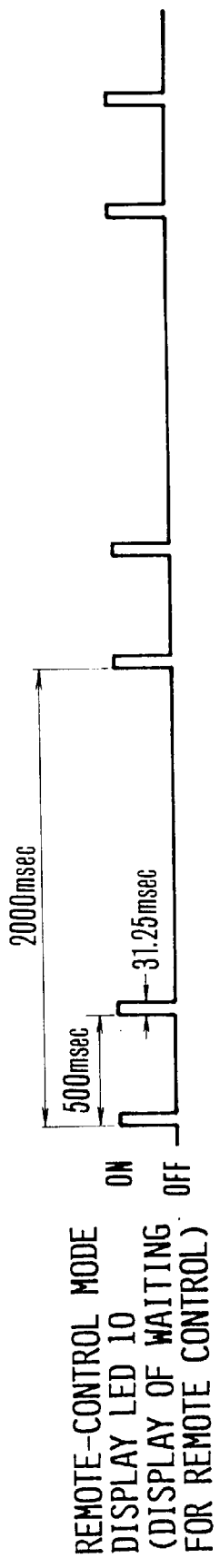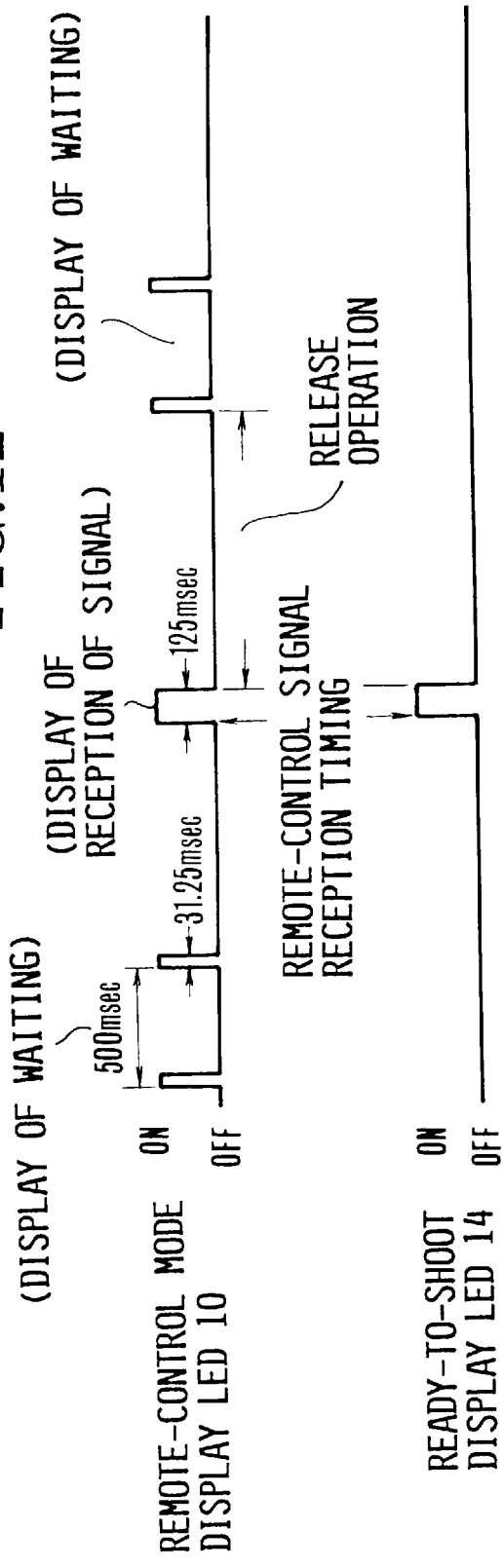
FIG.12
FIG.14

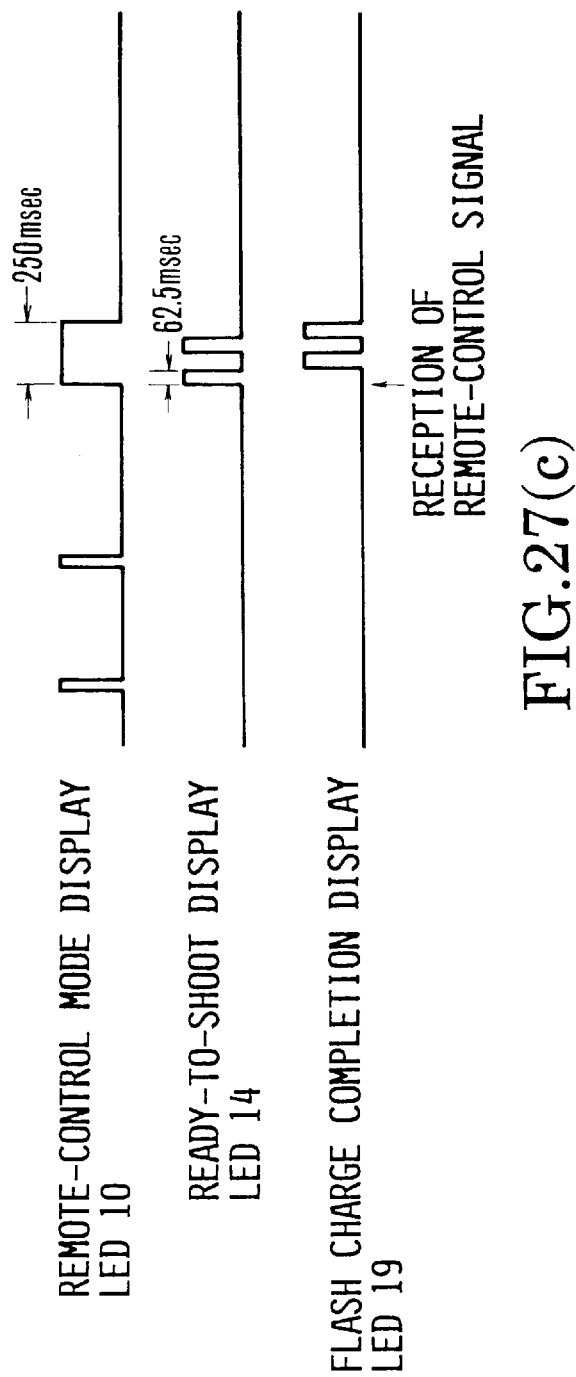

CAMERA CAPABLE OF REMOTE-CONTROL OPERATION

This a continuation application under 37 CFR 1.62 of the prior application Ser. No. 08/326,051, filed Oct. 19, 1994, now abandoned, which is a continuation of application Ser. No. 08/159,933, filed Nov. 30, 1993, now abandoned, which is a continuation of application Ser. No. 07/908,428, filed Jun. 30, 1992, now abandoned, which is a continuation of application Ser. No. 07/485,377, filed Feb. 26, 1990, now abandoned.

BACKGROUND OF THE INVENTION

1. Field of the Invention

This invention relates to improvements of the remote-control capability of a camera by remote-control signals.

2. Description of the Related Art

The conventional camera which is operated by remote-control signals has only its release function made to operate by remote control. Yet, if the capability to perform zooming of the photographic optical system by the remote-control signal, is introduced the remote-control device will provide a greater advantage. That is, with only the incremental increase of the cost of a switch or the like for adding a signal for zooming to the remote-control signal, the versatility of the remote control is doubled. But, while the method of performing zooming by the remote control is simple, the following problem arises.

The simplest means for remote-control zooming is of the type wherein zooming occurs only when the remote-control zooming signal is being received. That is, the turning-on of the zooming switch and the reception of the remote-control signal are equivalent to each other when a zooming operation is initiated. With this method, on the other hand, there is need to output the remote-control zooming signal continuously for the entire time zooming is desired. But, to maintain continuous output of the remote-control signal, the remote-control transmitter is required to have a battery of large capacity. Therefore, this method is not suited to the aim of minimizing the size of the remote-control transmitter.

Also, setting the size of that transmitter aside, even if the continuous signal could have been output, the use of the above method for carrying out zooming only when the zooming signal is being sent would lead to a difficult task for the operator to confirm how much zooming has been done. For example, an analogy is the adjustment of the volume of a television set, how much the volume of the television set has varied can be confirmed by hearing the sound and, as the volume is displayed in the picture, can simply be confirmed by looking at the display. For the camera, on the other hand, as zooming goes on, to confirm from a remote location what zooming position it lies at, display means must be added. But to employ means for clearly displaying the zooming position in the camera is very difficult from the point of view of the size of the camera.

From the foregoing, it is understandable that the method of carrying out zooming only when the remote-control signal is being sent out is unsuited to realize the usefulness of the remote-control zooming camera.

Summary of the Invention

An object of the present invention is to provide a camera capable of remote-control operations with signal receiving means for receiving a remote-control signal and magnification altering means responsive to an output of the signal receiving means for altering a magnification varying state of a photographic optical system by a relatively large amount, so that when the camera operates in the remote control mode, the magnification varying state of the photographic optical system is easy to confirm, manageability also is good, and, further, the consumption of electric current in the remote-control transmitter can be minimized.

Another object of the invention is to provide a camera capable of remote-control operations with signal receiving means for receiving a remote-control signal, magnification altering means responsive to an output of the signal receiving means for largely altering a magnification varying state of a photographic optical system, and displaying means for making a different display depending on the magnification varying state of the aforesaid photographic optical system, wherein when the camera is operated by the remote control, the magnification varying state of the photographic optical system can surely be confirmed even from a location far from the camera.

Still another object of the invention is to provide a camera capable of remote-control operations with signal receiving means for receiving a remote-control signal, and displaying means for making a display so that a state of the camera which has responded to an output of the signal receiving means can be confirmed even from behind the camera.

Other objects of the invention will become apparent from the description of embodiments thereof.

BRIEF DESCRIPTION OF THE DRAWINGS

FIG. 5 is a table of the ON/OFF relationship of a zoom position switch with the zooming position of the camera of FIG. 1(a).

FIG. 12 is the timing chart for presenting a display of waiting for remote control.

FIG. 14 is a timing chart for presenting a display of the remote-control operation of the same circuit it has received the remote-control signal.

FIG. 27(a), 27(b) and 27(c) are timing charts for the operations of FIGS. 26(a)-26(c).

DETAILED DESCRIPTION OF THE PREFERRED EMBODIMENTS

The present invention is next described in connection with embodiments thereof by reference to the drawings.

Figure 1A:
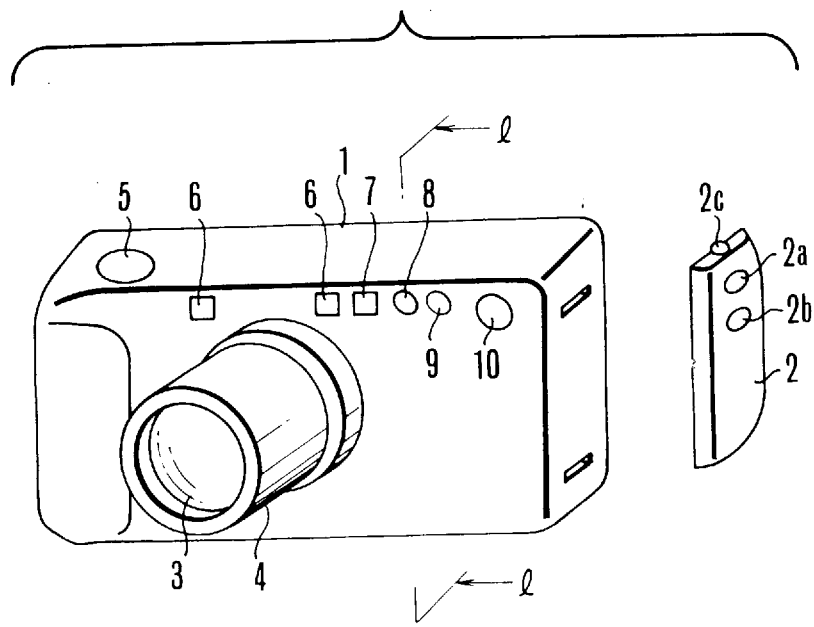
FIGS. 1(a) and 1(b) are perspective views of the outer appearance of a camera and a remote-control transmitter illustrating an embodiment of the invention, with FIG. 1(a) being its front perspective view, and FIG. 1(b) being its back perspective view.
Figure 1B:
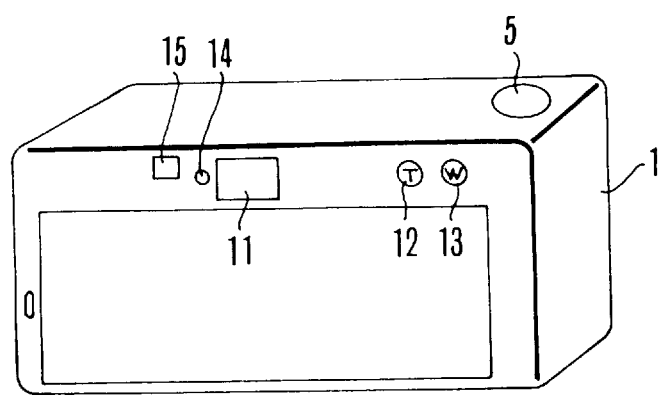

FIG. 1(a) and 1(b) show a perspective view of the outer appearance of a camera and a remote-control transmitter according to the invention, the perspective view of Fig. 1(a) being looked from its front side and the perspective view of FIG. 1(b) being looked from its back side.

In FIGS. 1(a) and 1(b), a camera body 1 has a remote-control transmitter 2 attachable thereto or detachable therefrom. On its front panel, there is a zoom lens 3 in a barrel 4. Reference numeral 5 denotes a release button. Distance measuring windows 6, a finder window 7, a remote-control signal receiving window 8, a light measuring window 9 and a remote-control mode display LED 10 are on the front panel. In the rear panel, there are a finder eyepiece window 11, a telephoto zooming switch 12 (hereinafter referred to as "TLSW"), a wide-angle zooming switch 13 (hereinafter referred to as "WDSW") and an LED 14 for displaying that the camera is ready to shoot. The transmitter 2 has a button 2a for sending a remote-control release signal, another button 2b for sending a remote-control zooming signal, and an LED 2c for sending the remote-control signal.

Further, in the camera of the present embodiment, it is made possible to receive the remote-control signal even at the back of the camera body 1. For this purpose, as shown in FIG. 1(b), the back panel, too, of the camera body 1 is provided with a remote-control signal receiving window 15, and, as shown by the $\ell - \ell$ cross section of FIG. 1(a) in FIG. 2, an optical system comprising a mirror 17 and a half-mirror 18 is built into the camera body 1 so that the remote-control signal entering at the window 15 is guided to a remote-control signal sensor 16.

Figure 2:
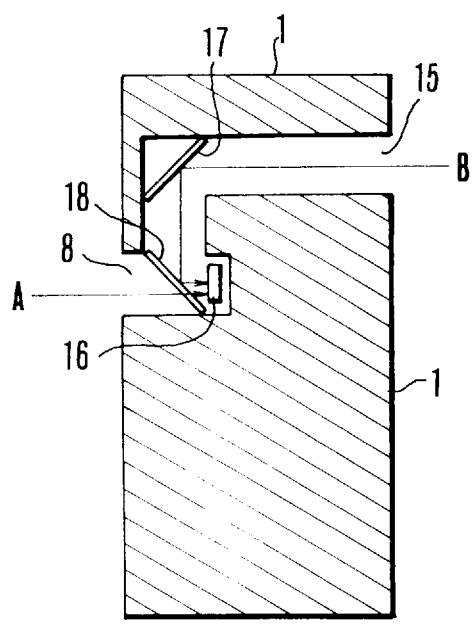
FIG. 2 is a cross-section view taken along line $\ell-\ell$ of the camera of FIG. 1(a).

And, the remote-control signal light coming from the front side of the camera along a path A of FIG. 2 enters at the front window 8 there of and passes through the half-mirror 18 to the sensor 16, while the remote-control signal light coming from the back side of the camera enters at the back window 15 along a path B of FIG. 2, is then reflected from the mirror 17 and the half-mirror successively and then reaches the common sensor 16. When the sensor 16 receives the signal light incident on either of the front side and the back side of the camera, the remote-control mode display LED 10 in the front panel and the ready-to-shoot display LED 14 adjacent the finder eyepiece window 11 are energized.

Figure 3:
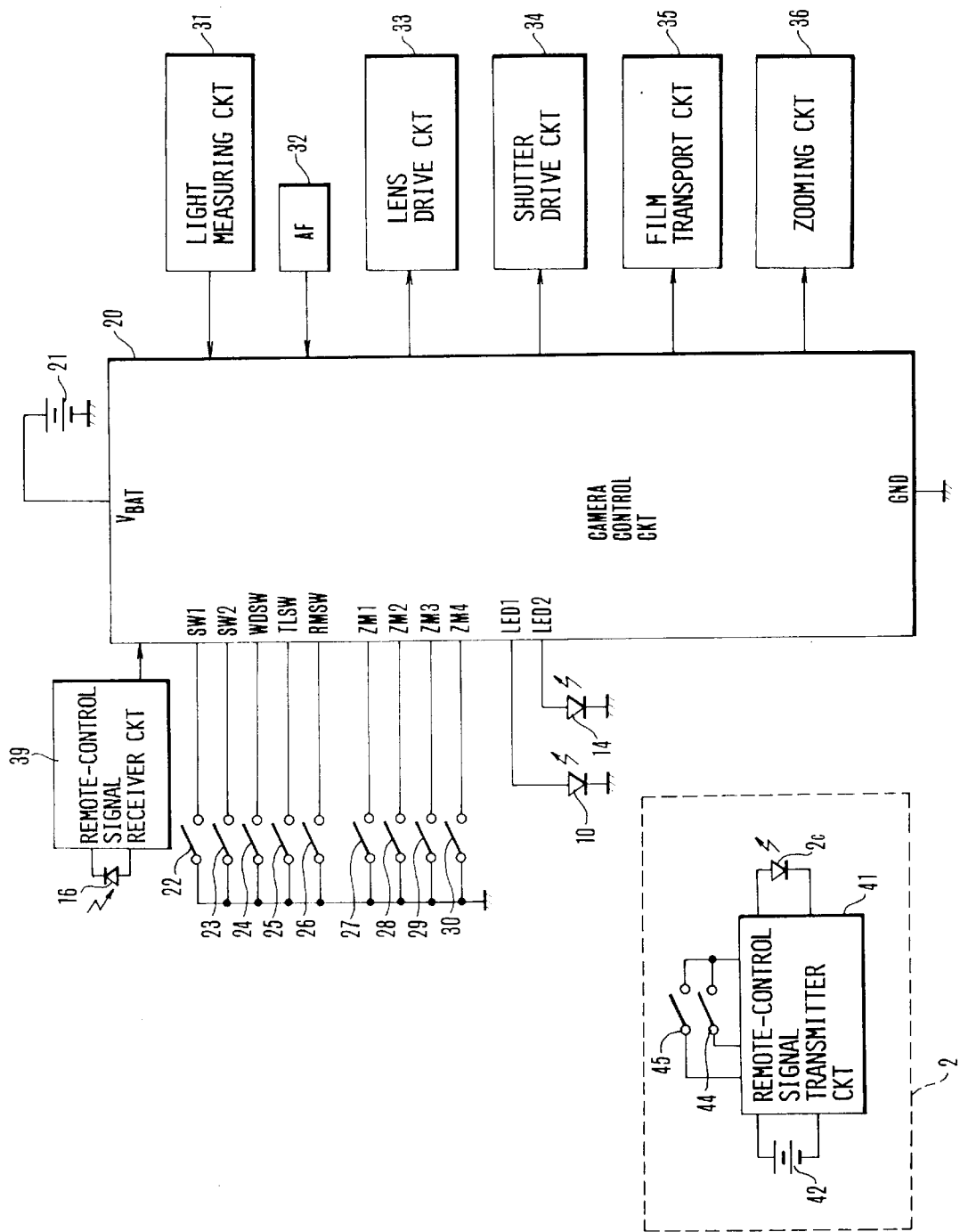
FIG. 3 is a block diagram of the circuitry of the camera and remote-control transmitter of FIG. 1(a).

FIG. 3 shows in block diagram the circuit of the camera and remote-control transmitter of FIGS. 1(a) and 1(b). In FIG. 3, reference numeral 20 denotes a camera control circuit having an electric power source or battery 21. A switch 22 turns on when the release button 5 is half or fully pushed down. Another switch 23 turns on only when the release button 5 is fully pushed. Another switch 24 turns on when the WDSW 13 is pushed. Another switch 25 turns on when the TLSW 12 is pushed. Another switch 26 turns on or off when the remote-control transmitter 2 is detached from or attached to the camera body 1 respectively. Four zoom position switches 27–30 are operatively connected to a zoom cam ring (not shown) for driving the zoom barrel 4, and turn on or off, depending on the zooming position. A light measuring circuit 31 produces information of the measured value of light. A distance measuring circuit 32 produces information of the measured value of the object distance. A lens drive circuit 33 moves the photographic lens 3 on the basis of the information of the distance measuring circuit 32. A shutter drive circuit 34 drives a shutter (not shown) on the basis of the information of the light measuring circuit 31. A film transport circuit 35, a zooming circuit 36 for driving the zoom barrel 4, the remote-control mode display LED 10 and ready-to-shoot display LED 14 and a remote-control signal receiver circuit 39 having the remote-control signal sensor 16 cooperate with the camera control circuit 20. The remote-control signal transmitter circuit 41 has an electric power source or battery 42. The LED 2c when energized produces the remote-control signal. A switch 44 turns on when the remote-control release signal sending button 2a is pushed. Another switch 45 turns on when the remote-control zooming signal sending button 2b is pushed.

Figure 4:
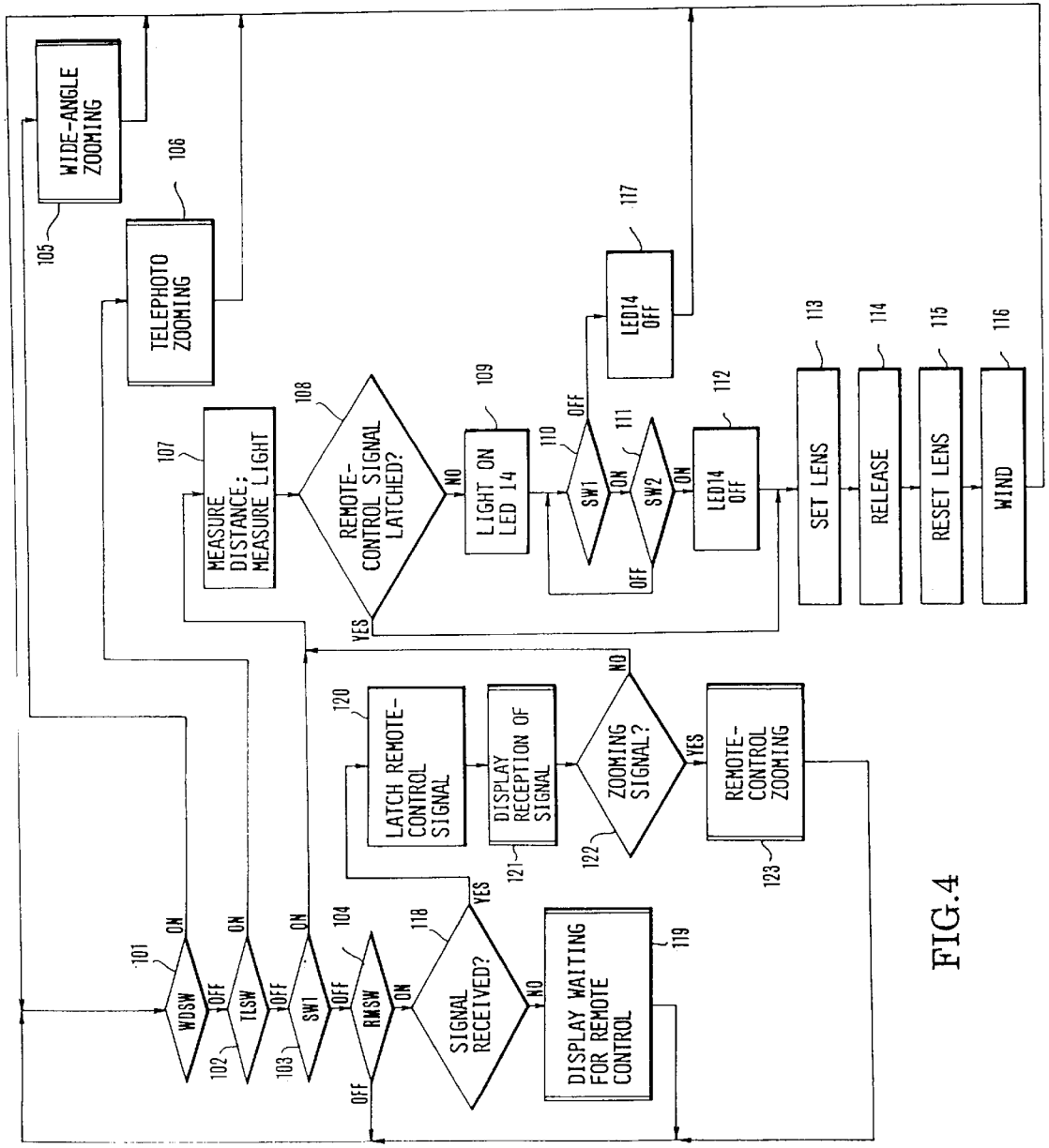
FIG. 4 is a flowchart illustrating a manner in which the circuit of FIG. 3 operates.

The operation of the circuit of FIG. 3 is described according to the flowchart of FIG. 4.

When the camera is not operated, the program cycles in a loop of steps: #101→#102→#103→#104→#→101 and so on. In the step #101, whether the WDSW 13 is not pushed is checked. If it is not pushed, the flow advances to the step #102, or if pushed, to a step #105 for a wide-angle zooming program. In the step #102, likewise check is done about the TLSW 12. If ON, the flow advances to a step #106 for a telephoto zooming program, or if OFF, to the step #103. In the step #103, the half stroke of the release button 5 is checked. If half pushed, as it implies that the switch 22 is in ON state (or a signal SW1 is applied to the control circuit 20), the flow advances to a step #107, or if not pushed, to the step #104. In the step #104, the switch 26 is checked. In a case where the camera operator intends to use the remote-control mode, he will take the remote-control transmitter 2 off. Upon removal of this, the switch 26 turns on, so that an RMSW signal is supplied to the camera control circuit 20. Hence, if the switch 26 is ON, as it implies that the remote-control mode is operated, the flow advances to a step #118 for checking when the reception of a remote-control signal occurs, or if OFF, the flow returns to the step #101.

If, in the aforesaid step #103, the switch 22 is ON, the flow advances to a step #107 where the light measuring circuit 31 and the distance measuring circuit 32 are rendered operative. In the next step #108, whether or not the remote-control signal has been latched is checked. Since, in the case of the turning-on of the switch 22, latching of the remote-control signal does not occur, the flow advances to a step #109 where the ready-to-shoot display LED 14 is energized (by an actuating signal LED2), thus indicating that a release actuation is possible.

A step #110 is to check whether or not the switch 22 (SW1) is turned off. If OFF, the flow advances to a step #117 where the ready-to-shoot display LED 14 is deenergized and then returns to the step #101. If ON, the flow advances to a step #111 for checking whether or not the signal SW2, is present that is, the switch 23, turns on. As the operator intends to take a shot, when he fully pushes the release button 5, the switch 23 turns on, causing the flow to advance to a step #112. If the release button 5 remains half pushed, the flow cycles in a loop of steps: #110→#111→#110 and so on. If it is freed from the depression, the ready-to-shoot display LED 14 is deenergized in the step #117 as has been described above, and return to the step #101 occurs. By the step #112, the ready-to-shoot display LED 14 is deenergized. The flow then advances to a step #113 where the lens 3 is set to an in-focus position. Then, the shutter is released in a step #114. Then, the lens 3 is returned to the initial position in a step #115. Then, the film is wound by one frame in a step #116. Then, the flow returns to the step #101. Thus, the shooting of one frame is completed.

In a case where the remote-control transmitter 2 is taken off, the flow goes from the step #104 to the step #118 where whether or not the camera has received the remote-control signal is checked. If it is received, this signal is latched (memorized) in a step #120. The fact that the camera has received the remote-control signal is then displayed in a step #121. Whether or not this signal is the zooming one is then checked in a step #122. If not the remote-control zooming signal, it is the remote-control release signal. So, the flow advances to the step #107. The step #107 is followed by the step #108 for checking the latch of the remote-control signal. Because it has been latched in the step #120, the flow passes a different way from that when the release button 5 was pushed, immediately advancing to the step #113. Then, the above-described release operation proceeds from the steps #113 past the : steps: #114→#115→#116 and therefrom returns to the step #101.

Again, if it has been checked in the step #118 that the remote-control signal is not received, the flow advances to a step #119 for displaying that the remote-control signal is waited for and then the flow returns to the step #101.

Next, the zooming operation is described.

As has been described before, what zooming position the lens barrel 4 is taking, that is, what number of millimeters the focal length, is usually detected by the zoom position switches 27–30. For example, FIG. 5 shows the variation of the combination of the ON/OFF states of the switches 27–30 as a function of the focal length. This results in varying the levels of the input signals ZM1–ZM4. This information is read in the camera control circuit 20. By its value, what number of millimeters the focal length is taking at the present time is determined. The information of the focal length is used mainly to correct the measured values of the object distance and the light for the AF and AE purposes. On this account, the number of zones into which the range from the telephoto end to the wide-angle end is to be divided is chosen so as not to impair the desired accuracy of each of the AF and AE controls.

In FIG. 5, the zooming range of 38–85 mm is divided into 13 zones. The combination of the states of the input signals ZM1–ZM4 is labeled N where N=1–13 . The focal lengths for the zooming positions of the zone N are assumed to have a central value f. This is written in, for example, the ROM table of a microcomputer in the camera control circuit 20 of FIG. 3. For the given combination of the states of the input signals ZM1–ZM4 as read in the circuit 20, the microcomputer itself determines the values of N and f with reference to the table of FIG. 5.

Figure 6:
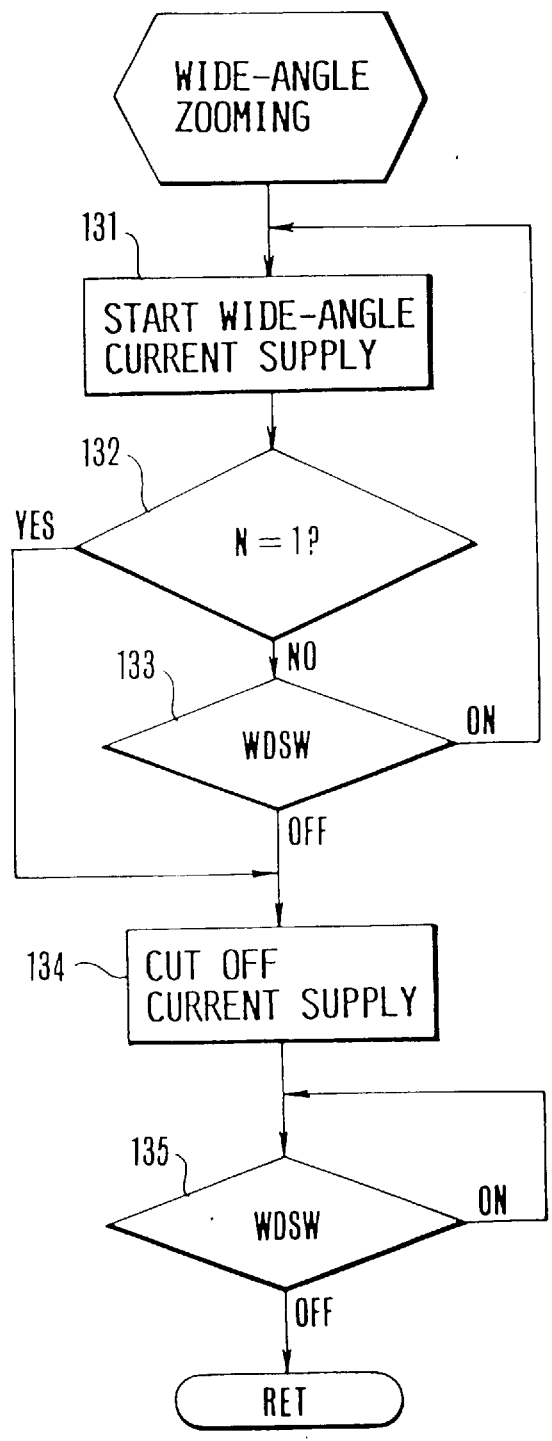
FIG. 6 and FIG. 7 are flowcharts for a manual zooming operation of the circuit of FIG. 3.
Figure 7:
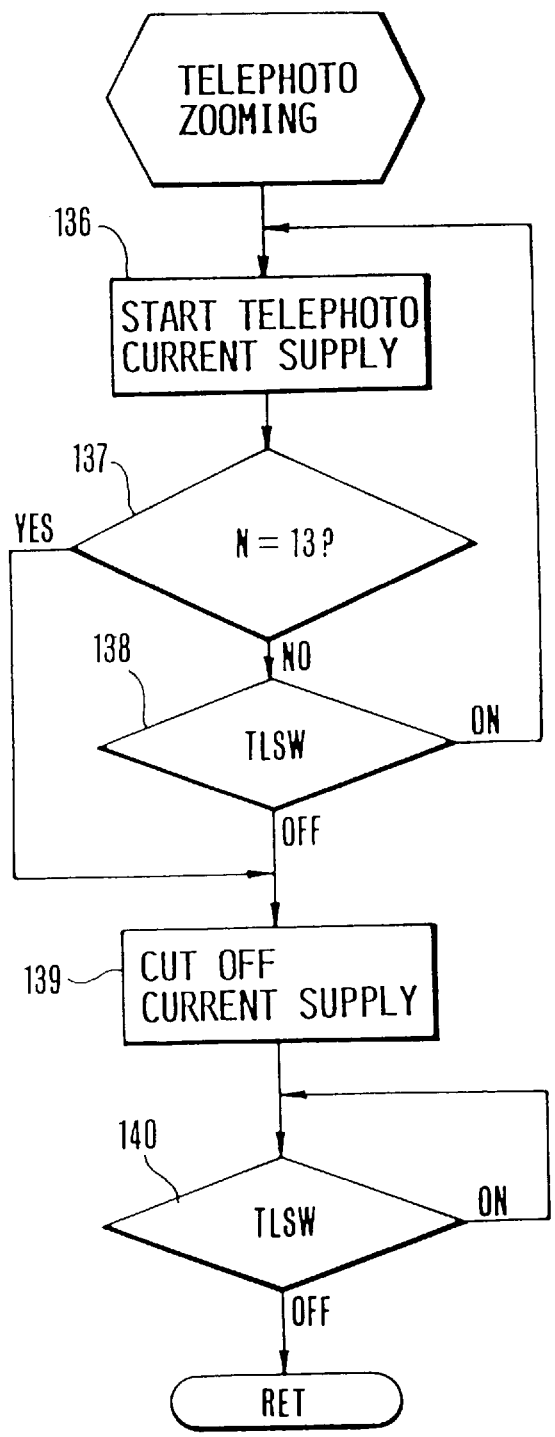

Programs for zooming are shown in FIG. 6 and FIG. 7.

When the flow of FIG. 4 advances to a step #105, the wide-angle zooming program of FIG. 6 is executed, beginning with the start at a step #131. Here, a current supply for the wide-angle setting is first started. The flow then advances to a step #132 for checking whether or not the lens 3 lies at the wide-angle end. This is carried out by reading the input signals ZM1–ZM4, finding the corresponding one of the Ns with the help of the table, and then checking whether or not the found value of N is "1". If N=1, the lens 3 is determined to lie at the wide-angle end. So the flow advances to a step #134. If N≠1, on the other hand, the flow advances to a step #133 for checking whether or not the WDSW 13 is pushed, or the switch 24 is turned on. If ON, the flow returns to the step #131, continuing zooming toward the wide-angle setting. If OFF, the flow advances to a step #134. When the wide-angle setting (N=1) is reached, or when the WDSW 13 is freed, the flow advances to the step #134 for cutting off the current supply. After the turning-off of the WDSW 13 is confirmed in a step #135, the flow returns to the step #105 and further to the step #101.

Zooming to the telephoto direction (step #106 in FIG. 4) is also similarly carried out by steps #136–#140. In a step #137, similarly to the step #132, N is evaluated and if N=13 is checked. If N=13, the lens 3 is determined to lie at the telephoto end.

Figure 8:
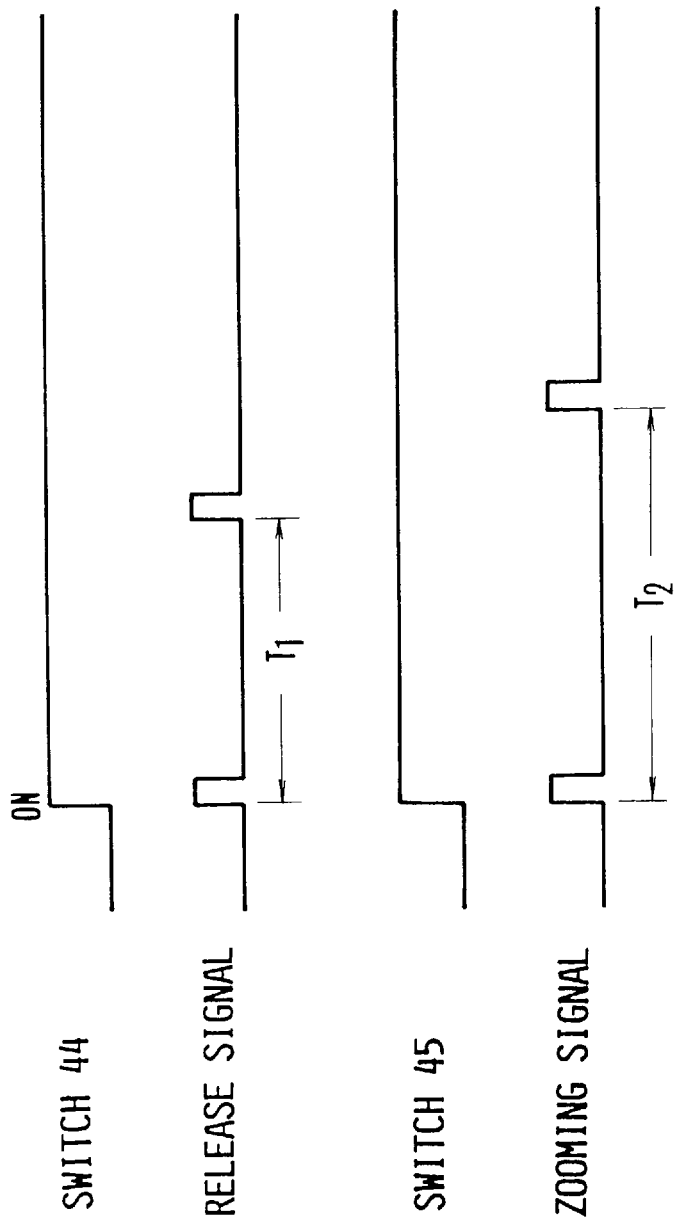
FIG. 8 is a timing chart for that part of the circuit of FIG. 4 which is on the remote-control transmitter side.

Next, remote-control zooming is described. FIG. 8 is a timing chart of the moments at which the switches of the remote-control transmitter 2 have turned on and the moments at which the remote-control signal transmitter circuit 41 responsive to the turning-on of each switch produces respective signals as they are sent out from the LED 2c. These signals have different periods ($T_1$, $T_2$) from each other, of which discrimination is performed by the remote-control signal receiver circuit 39 of FIG. 3.

In FIG. 4, when the camera receives the remote-control signal in the step #118, the remote-control signal is latched in a step #120. A reception display is then presented in a step #121, and then if it is the remote-control zooming signal is checked in a step #122. That is, the signal received by the remote-control signal receiver circuit 39 is taken in the camera control circuit 20 and the code of the signal is examined. If the received signal is determined in the step #122 not to be the zooming one, as it implies the release signal, the flow advances to the step #107.

Again, in the step #122, if it is determined to be the zooming signal, a remote-control zooming program of a step #123 is executed. An example of this remote-control zooming program is shown in FIG. 9.

In a step #141, what focal length position the lens 3 is to zoom to is determined. The target zoom position is set in terms of a corresponding value of N in FIG. 5. Now assuming that the set value of N is $N_0$. The ON/OFF states of the zoom position switches 27–30, or the input signals ZM1–ZM4, are then read in a step #142 to find the present zoom position N by a program referring to the table. The found value of N is then compared with $N_0$ in a step #143. If it is equal, the flow advances to a step #147 where the power supply to a zoom motor (not shown) is cut off, and returns to the step #123 of FIG. 4.

In the case of $N \neq N_0$ determined in the aforesaid step #143, the flow advances to a step #144 where the N is compared with $N_0$. If $N>N_0$, as it implies that the present zoom position lies on the telephoto side of the target zoom position, the flow advances to a step #146 where the zoom motor is supplied with current of the direction to the wide-angle side. If not $N>N_0$ on the other hand, the flow advances to a step #145 where current of the reverse direction, or to the telephoto side, is supplied. In either case of the steps #145 and #146, the flow then returns to the step #142. Thus, a loop is formed. Since, in this loop, proper selection of the telephoto- or wide-angle-oriented current supply is effected, the zoom position changes toward the target one. And, when $N=N_0$ is reached, the flow goes out of the aforesaid loop as from the step #143 to a step #147 where the current supply to the zoom motor is cut off. The flow then returns to the step #123. From the step 123, the flow returns to the step #101, thus returning to the loop of waiting for a remote-control signal or any other input such as that from the release button.

Figure 9:
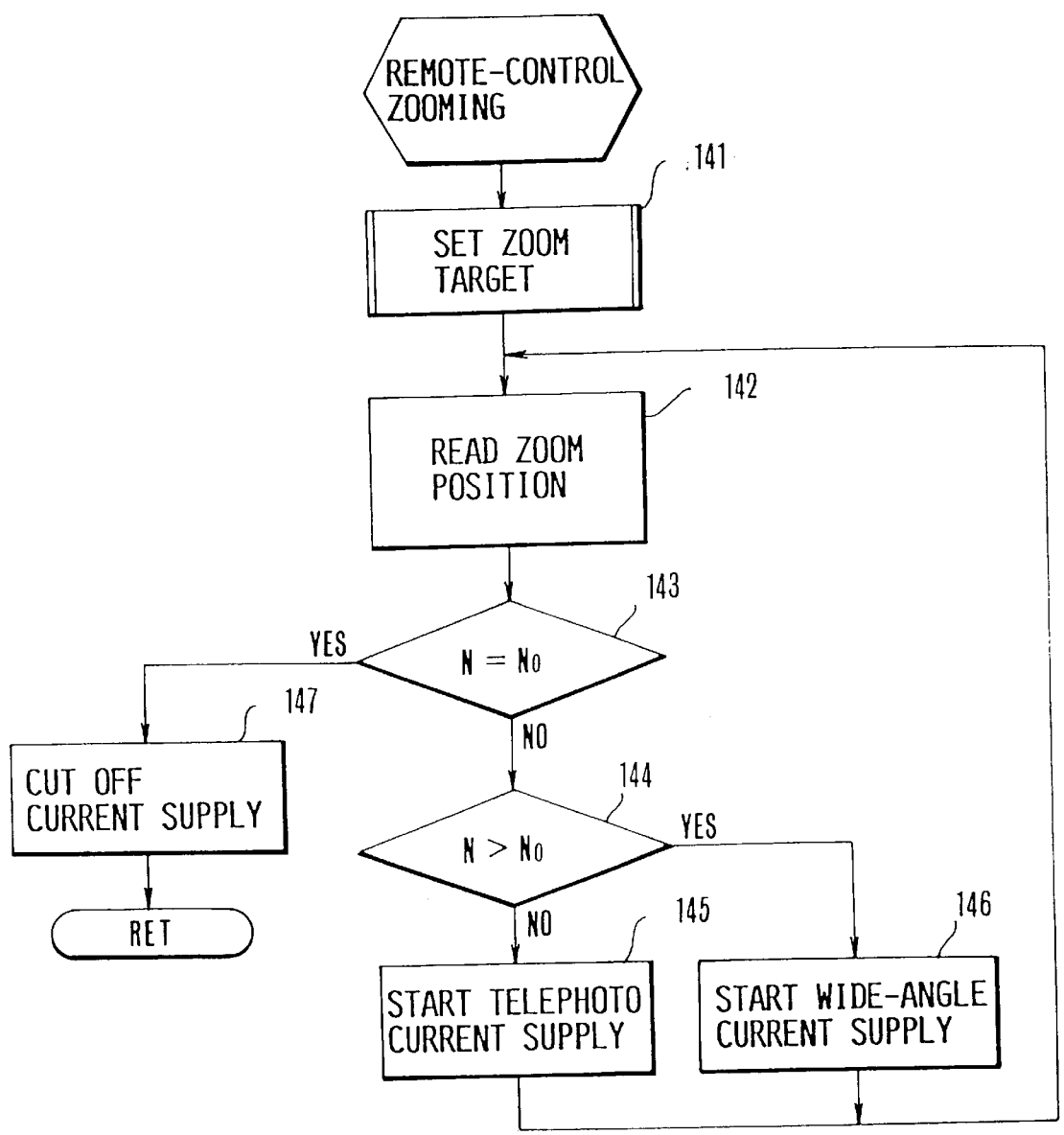
FIG. 9 is a flowchart for a remote-control zooming operation of the circuit of FIG. 3.
Figure 10:
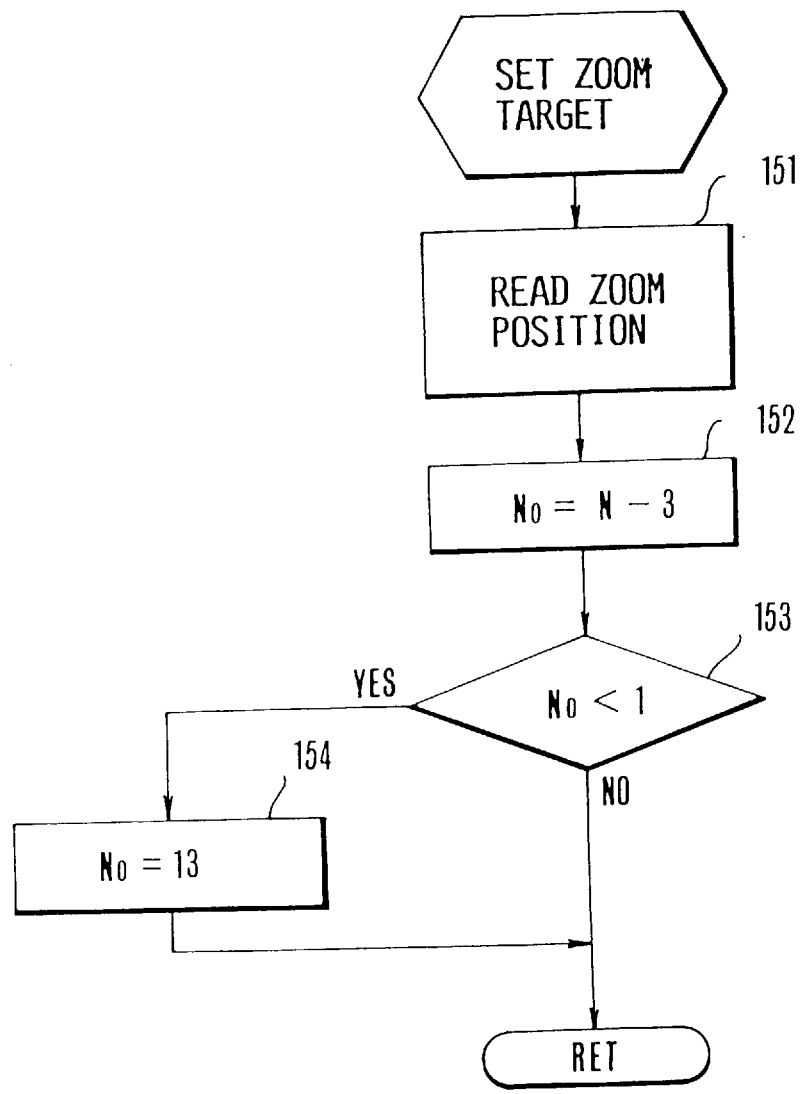
FIG. 10 is a flowchart for the operation of FIG. 9 at the time of setting a target for zooming.

Next, a program for setting the zoom target of the step #141 of FIG. 9 is described by using FIG. 10. A step #151 is first executed to read in the present zoom position N. In a step #153, (N-3) is taken as $N_0$. In other words, the operator selectively sets (skippingly selects) three zones the lens 3 is to move toward the wide-angle side. The flow advances to a step #153 for checking if $N_0$ is smaller than "1". If so, as it implies that the lens 3 can no longer be brought toward the wide-angle side, $N_0=13$ is set. Thus, the telephoto end is made target. In such a manner, the setting of $N_0$ is controlled when the steps #142–#147 constituting the remote-control zooming program are executed. So each time the remote-control signal is received, zooming by three zoom zones toward the wide-angle end is carried out. After the wide-angle end is reached, the lens 3 returns to the telephoto end.

With such a remote-control zooming scheme, for every one time the zooming signal sending button 2b is pushed, the lens 3 moves a distance equivalent to one quarter of the focal length range of 38–85 mm. Hence, four remote-control signals sent suffice for moving the lens 3 from the telephoto end to the wide-angle end.

The program of FIG. 10 is written so that the zooming position is changed by three zones for every one remote-control signal from the following reason. In the case of using the TLSW 12 and WDSW 13 arranged on the camera body to perform zooming while looking through the finder 11, the focal length must be finely adjusted. But in the case of using the remote-control transmitter 2 to perform zooming, the aim is not to change the focal length in fine discrete values for delicate framing, but to take shots with variation of the angle of view to some extent. Therefore, if the zooming is effected by one zooming position for every one remote-control zooming signal, the adjustment would be too fine for practice. Another advantage arising from the use of a large stroke of zooming movement of the lens 3 is that, as the zoom lens 3 is used like, in the instance of the program of FIG. 10, a 4-focal length lens, it becomes easy to confirm the zooming position from a position remote from the camera body 1. In application to a camera having a display representing what zooming position is occurring in any form, still another advantage is produced that the necessary number of zooming positions to be displayed is very much reduced.

Next description is given to a step #119 (display of waiting for remote-control) and a step #121 (display of reception of remote-control) both in FIG. 4.

Here, the microcomputer in the camera control circuit 20 has a timer called "TC1/TC0". The TC1/TC0 is of 8-bit type, TC1 referring to the upper 4 bits, and TC0 to the lower 4 bits. The counting speed is assumed to be 128 Hz. Therefore, one period of counting is 2 sec. The remote-control wait display of the step 119 of FIG. 4 is executed as shown in FIG. 11, and its timing in FIG. 12.

Figure 11:
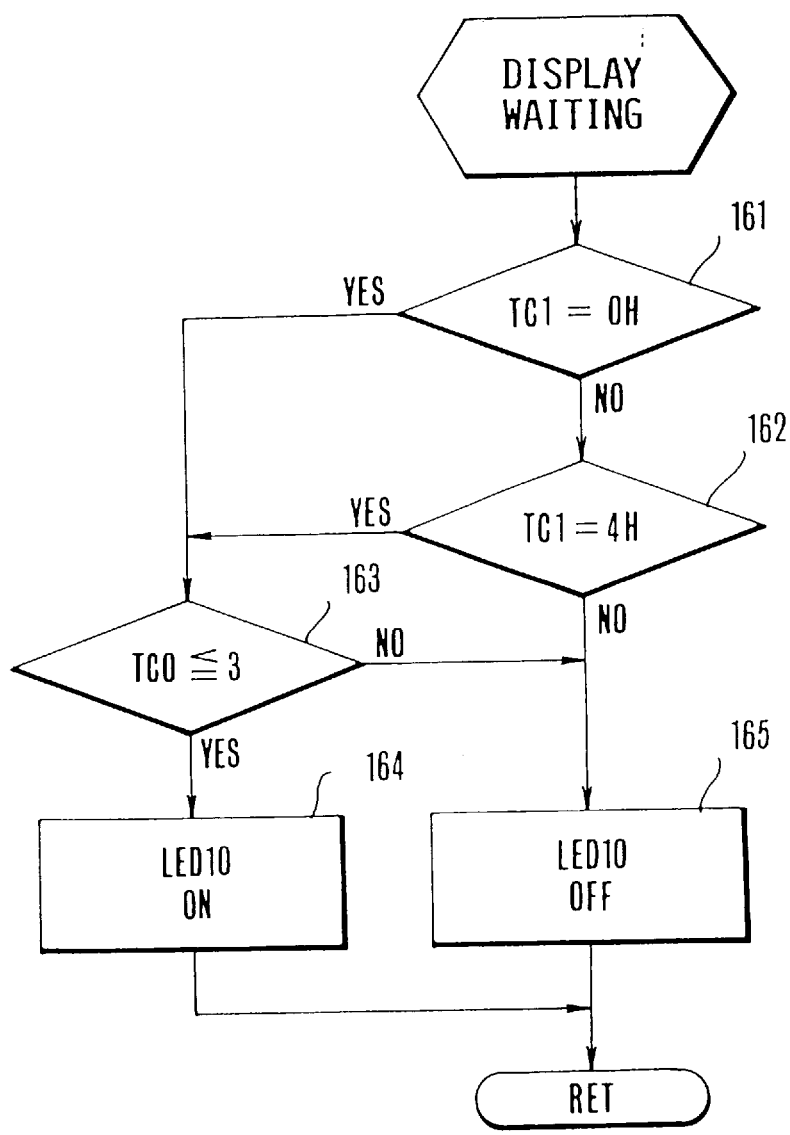
FIG. 11 is a flowchart for an operation of the circuit of FIG. 3 at the time of displaying "wait".

In FIG. 11, if TC1=0H (hexadecimal number) is first checked in a step #161. Otherwise, if TC1= 4H is then checked in a step #162. In the case of neither TC1=0H nor TC1= 4H, the flow advances to a step #165. In the case of TC1=0H or TC1=4H, the flow advances to a step #163. A step #163 then checks if $TC0 \leq 3H$. If this results in finding TC0<3H, the flow advances to a step #164. If TC0>3H, the flow advances to a step #165. In the step #164, the remote-control mode display LED 10 is lighted on. In the step #165, the LED 10 is turned off. And, in either case, the flow returns to the step #119.

The steps #119 (#161→#163→#164 or #161→#162→#165 or #161→#163→#165 or #161→#162→#163→#164 or #161→#162→#163→#165→#101→#102→#103→#104→ #118→#119→#101 form a loop. As a result, the remote-control mode display LED 10 is lighted on for the following period:

$00H \leq TC1/TC0 \leq 03H (0 \leq T \leq 31.25$ msec.)

$40H \leq TC1/TC0 \leq 43H (500$ msec. $\leq T \leq 531.25$ msec.)

This display is presented in such a way as shown in FIG. 12.

Figure 13:
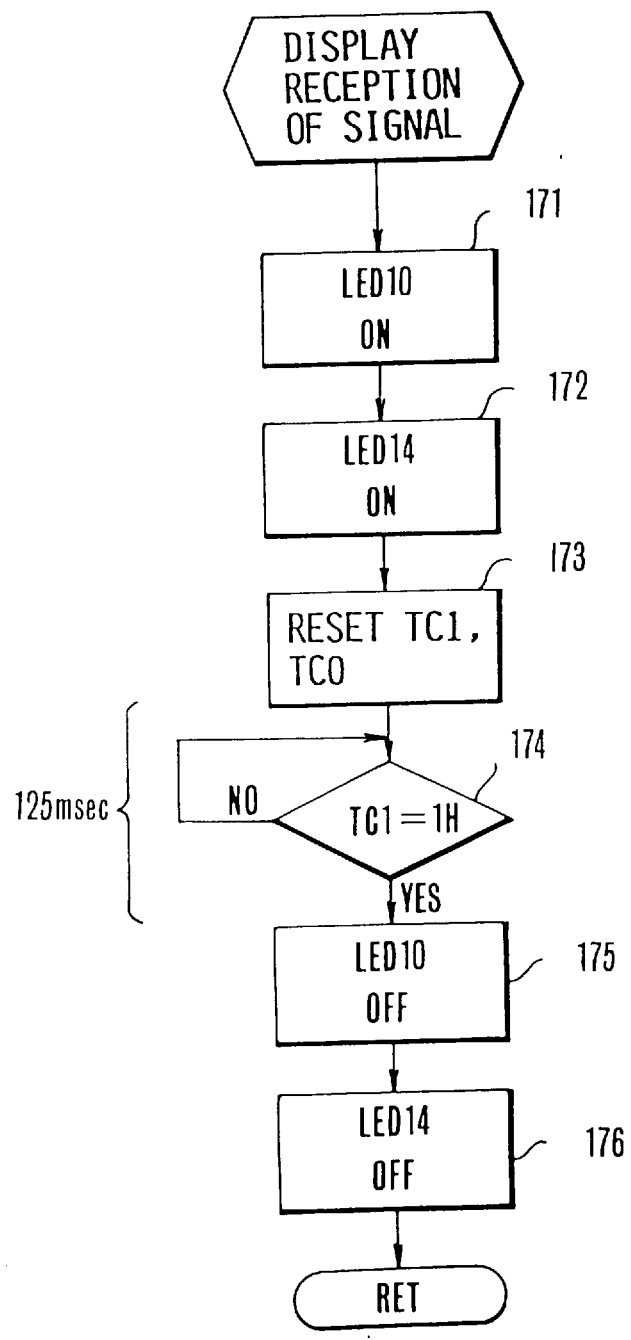
FIG. 13 is a flowchart for an operation of the circuit of FIG. 3 in displaying the receipt of a remote-control signal.

Also, the remote-control signal reception display of the step #121 is executed as shown by FIG. 13 and its timing is shown in FIG. 14.

In FIG. 13, the remote-control mode display LED 10 is energized in a step #171, and the ready-to-shoot display LED 14 is energized in a step #172. The timer TC1/TC0 is reset in a step #173. A step #174 is to wait for TC1 becoming 1H. In 125 msec. from the execution of the step #173, TC1=1H occurs. The flow then advances to a step #175 where the remote-control mode display LED 10 is deenergized. The ready-to-shoot display LED 14 is lighted off in a step #176. After this, the flow returns to the step #121. And the flow of FIG. 4 advances past the steps: #112→#107→#108→#113→#114→#115 →#116, thus carrying out a release operation. After the return to the step #101, the remote-control wait display of the step #119 is presented again. Hence, the display varies: (Waiting) → (Signal Reception) → (Release) → (Waiting).

This state allows the remote control to actuate a camera release as shown in FIG. 14. The occurrence of the camera release can be confirmed even in such a situation that the operator cannot hear the sound from the operating camera, provided he is looking at the remote-control mode display LED 10 or the ready-to-shoot display LED 14.

It is to be noted that the remote-control mode display LED 10, when the camera is of the type having a self-timer mode, may be used in common with the self-timer display. If so, there is no increase in the cost for the additional display.

Figure 15:
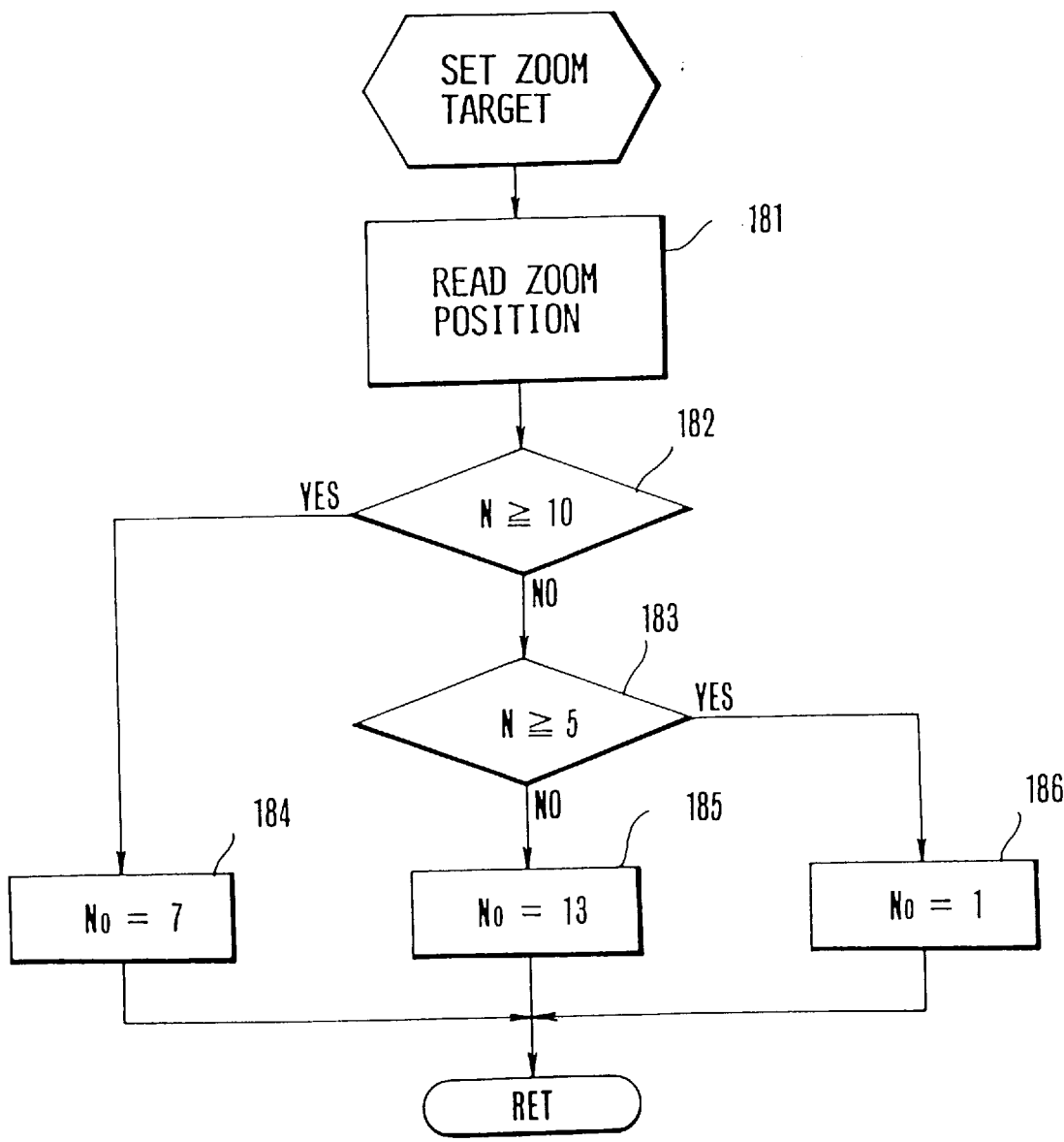
FIG. 15 is a flowchart for another example of an operation of setting a target for zooming in the circuit of FIG. 3.

FIG. 15 is a flowchart for another practical example of the program for setting the zoom target of the step #141 of FIG. 9.

In FIG. 15, the present zoom position N is read in a step #181. The flow advances to a step #182 where if $N \geq 10$ is checked. If $N \geq 10$, the flow advances to a step #184 for setting $N_0=7$. If N<10, the flow advances from the step #182 to a step #183 for checking if $N \geq 5$. If $N \geq 5$, the flow advances to a step #186 for setting $N_0=1$. If N<5, the flow advances to a step #185 for setting $N_0=13$. After the steps #184, #185 and #186 have been executed to set the respective values of $N_0$, return to the step #141 of FIG. 9 occurs.

By such a program of FIG. 15, for the given value of N, $N_0$ is determined as follows:

$$1 \leq N \leq 4 \rightarrow N_0=13$$

$$5 \leq N \leq 9 \rightarrow N_0=1$$

$$10 \leq N \leq 13 \rightarrow N_0=7$$

In short, N is divided into three regions of 1–4, 5–9 and 10–13 so that if the lens 3 lies in the telephoto region of N=10–13, it is to move to just the central zone $N_0=7$, if in the middle region of N=5–9, to the wide-angle end of $N_0=1$, or if in the wide-angle region of N=1–4, to the telephoto end of $N_0=13$. Therefore, for every one time the camera receives the remote-control zooming signal, zooming goes telephoto (N=13)→middle (N=7)→wide-angle (N=1)→telephoto (N=13) and so on.

With this, regardless of the initial zooming position, the values of the focal length to be used in the remote-control mode are known from the beginning. Therefore, it becomes quick and easy to affirm or bear in mind the values which the angle of view selectively takes as remote-control zooming occurs. Even when the zooming position is observed from a remote position, the operator needs only to distinguish three points N=13, 7 and 1.

Figure 16A:
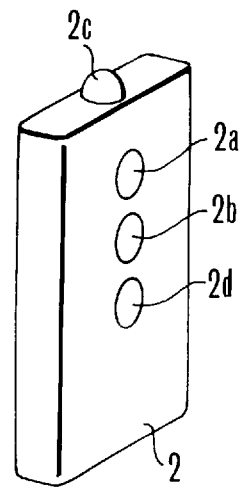
FIGS. 16(a) and 16(b) are respectively a perspective view of another embodiment of the remote-control signal transmitter according to the invention and a diagram of the construction of its circuitry.
Figure 16B:
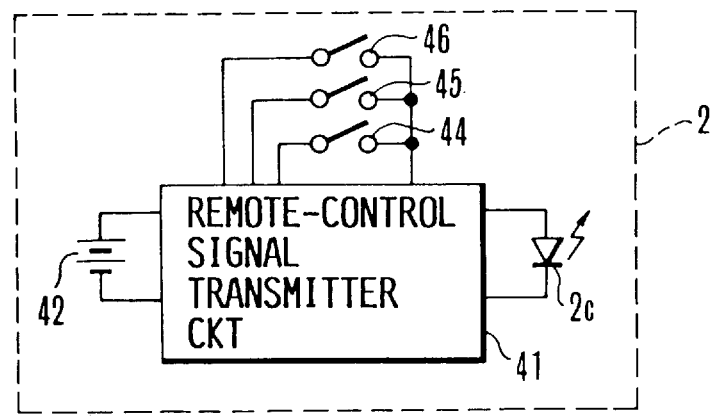

Though in the foregoing embodiment, the remote-control signal has been made in only one form, modification may be made with an increase of the sending code of the remote-control signal. In this case, the remote-control zooming signal may be considered to selectively take two forms to the telephoto and wide-angle sides. This is shown in FIGS. 16(a) and 16(b). A button 2d is added to the remote-control signal transmitter 2 of FIG. 16(a) and a switch 46 is added to the circuit of FIG. 16(b). A button 2a is used for the remote-control release (corresponding to the button 2a of FIG. 1(a)). Another button 2b is used for the remote-control wide-angle zooming (corresponding to the button 2b of FIG. 1(a)), and the button 2d is used for the remote-control telephoto zooming. The manner in which this embodiment operates is similar to that for the foregoing embodiment, except that the step #141 of FIG. 9 is altered as shown in FIG. 17.

Figure 17:
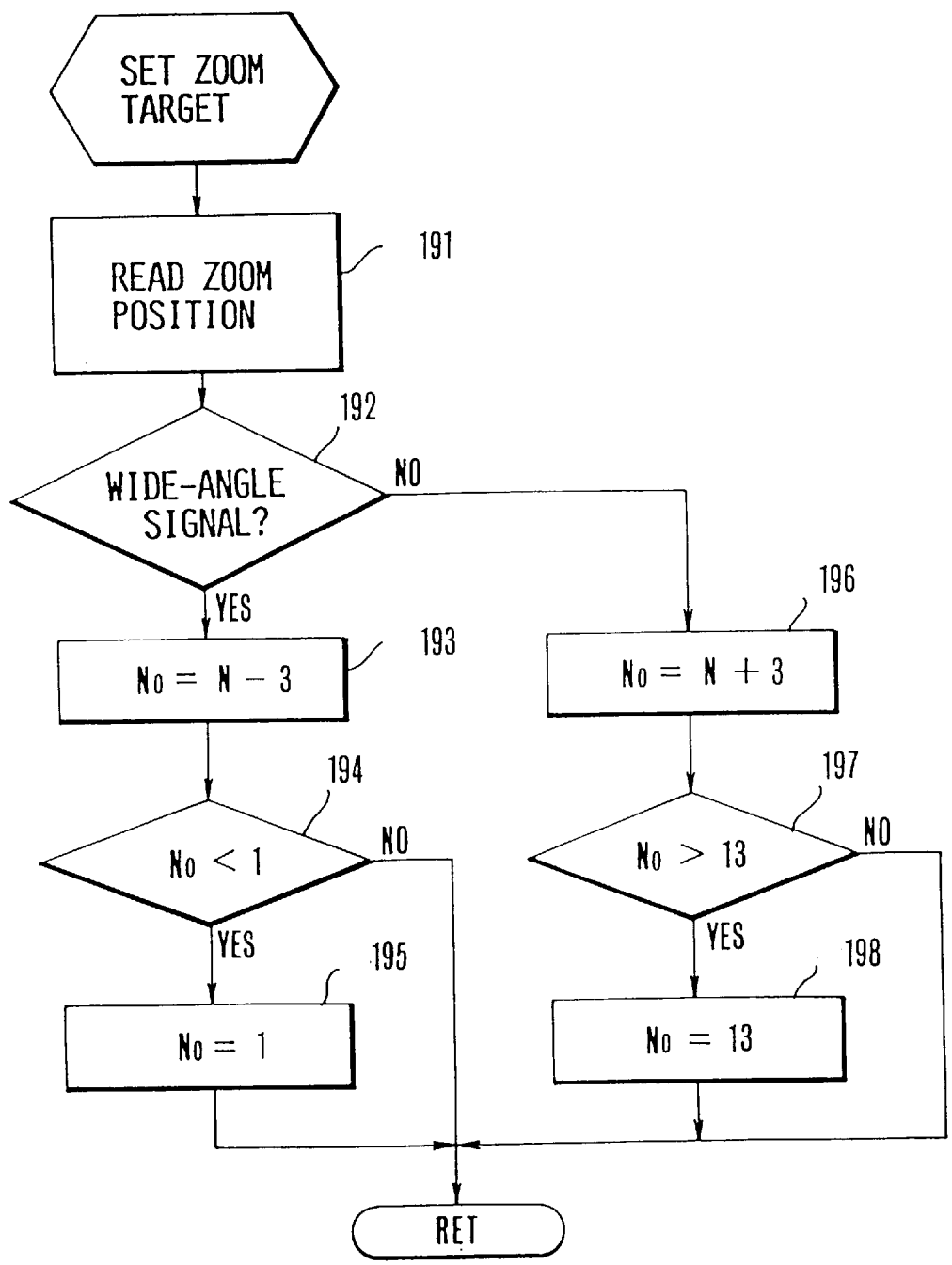
FIG. 17 is a flowchart for setting a target for zooming in the transmitter of FIG. 16.

Referring to FIG. 17, the present zooming position is read in a step #191, and whether the remote-control zooming signal is the wide-angle signal is checked in a step #192. If so, the flow advances to a step #193. If not so, as it implies the telephoto signal, the flow advances to a step #196. In the step #193, $N_0=N-3$ is set. In the next step #194, whether $N_0<1$ is checked. If $N_0<1$, the flow advances to a step #195 for setting $N_0=1$. If $N_0 \geq 1$, nothing is done and the flow returns to the step #141 of FIG. 9. A step #196 is to set $N_0=N+3$. In the next step #197, whether $N_0>13$ is checked. If $N_0>13$, the flow advances to a step #198 for setting $N_0=13$. If $N_0 13$, nothing is done and the flow returns to the step #141 of FIG. 9.

With the foregoing operation of FIG. 17, when the wide-angle zooming signal is sent, the camera moves the lens 3 by three zones toward the wide-angle end. When the telephoto zooming signal is sent, the camera moves the lens 3 by three zones to the telephoto end. The use of such two remote-control zooming signals makes it possible that one push of the zooming signal sending button carries out zooming in the desired direction by a desired amount.

Though, in the embodiments of FIG. 10 and FIG. 17, the changed amount of the zooming position for one cycle of zooming operation has been made constant at "3", this value may be altered depending on the design of the camera, and, in some cases, may be made to vary as a function of the zooming position.

Figure 18:
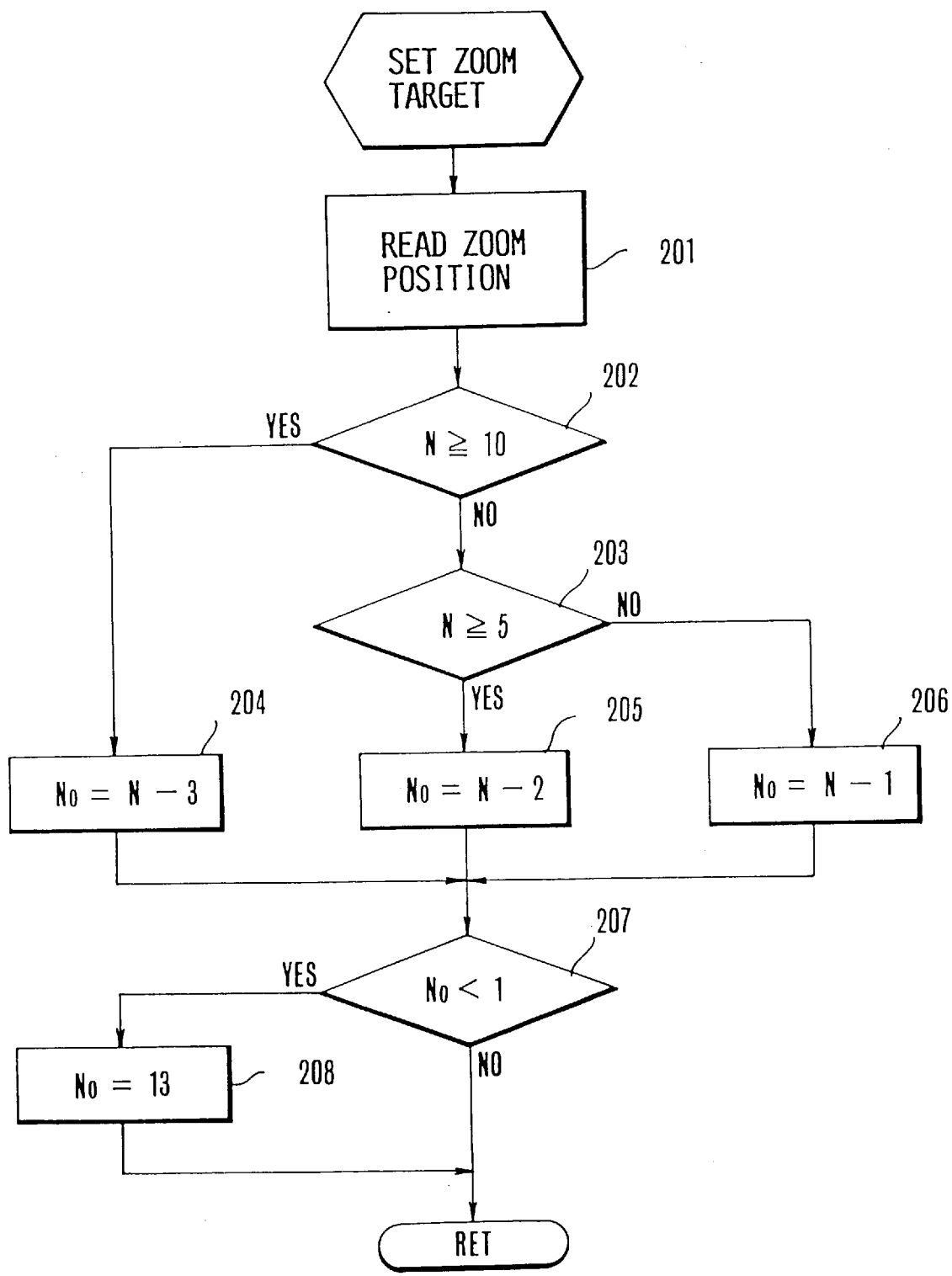
FIG. 18 is a flowchart for another example of an operation of setting a target for zooming in the circuit of FIG. 3.

For example, the program for setting a target zooming position is varied to that shown in FIG. 18. The present zooming position N is read in a step #201 and the value of N is checked in steps #202 and #203. These steps are exactly the same as the steps #182 and #183 of FIG. 15. And, depending on the found value of N, the following values are selectively set in $N_0$ by steps #204–#206.

| | |
|---|---|
| $1 \leq N \leq 4 \rightarrow N_0=N-1$ | (Step #206) |
| $5 \leq N \leq 9 \rightarrow N_0=N-2$ | (Step #205) |
| $10 \leq N \leq 13 \rightarrow N_0=N-3$ | (Step #204) |

And, if $N_0<1$ is found in executing a step #207, $N_0=13$ is set in a step #208.

In what case the example of FIG. 18 becomes necessary is now explained. The relationship of the zooming position and the focal length of FIG. 5 is defined in such a manner that all the zoom positions are classified to groups of almost equal rate of change of the angle of view. But, in a certain camera, the zooming position is taken into account when the focusing position is corrected. Like this, there is a case, too, where the wide-angle region must be divided roughly, while the telephoto region must be divided finely. For such a case, if the number of zones in which the remote-control zooming occurs is left constant, the change of the angle of view for one cycle of zooming operation is small on the telephoto side, while it is large on the wide-angle side. In short, to be applied to the camera where the zooming range cannot be divided to equivalent zones in respect to the change of the angle of view, the program of FIG. 18 has to be employed with an advantage that the changed amount of angle of view by every one cycle of zooming operation becomes more uniform over the entire zooming range.

Figure 19:
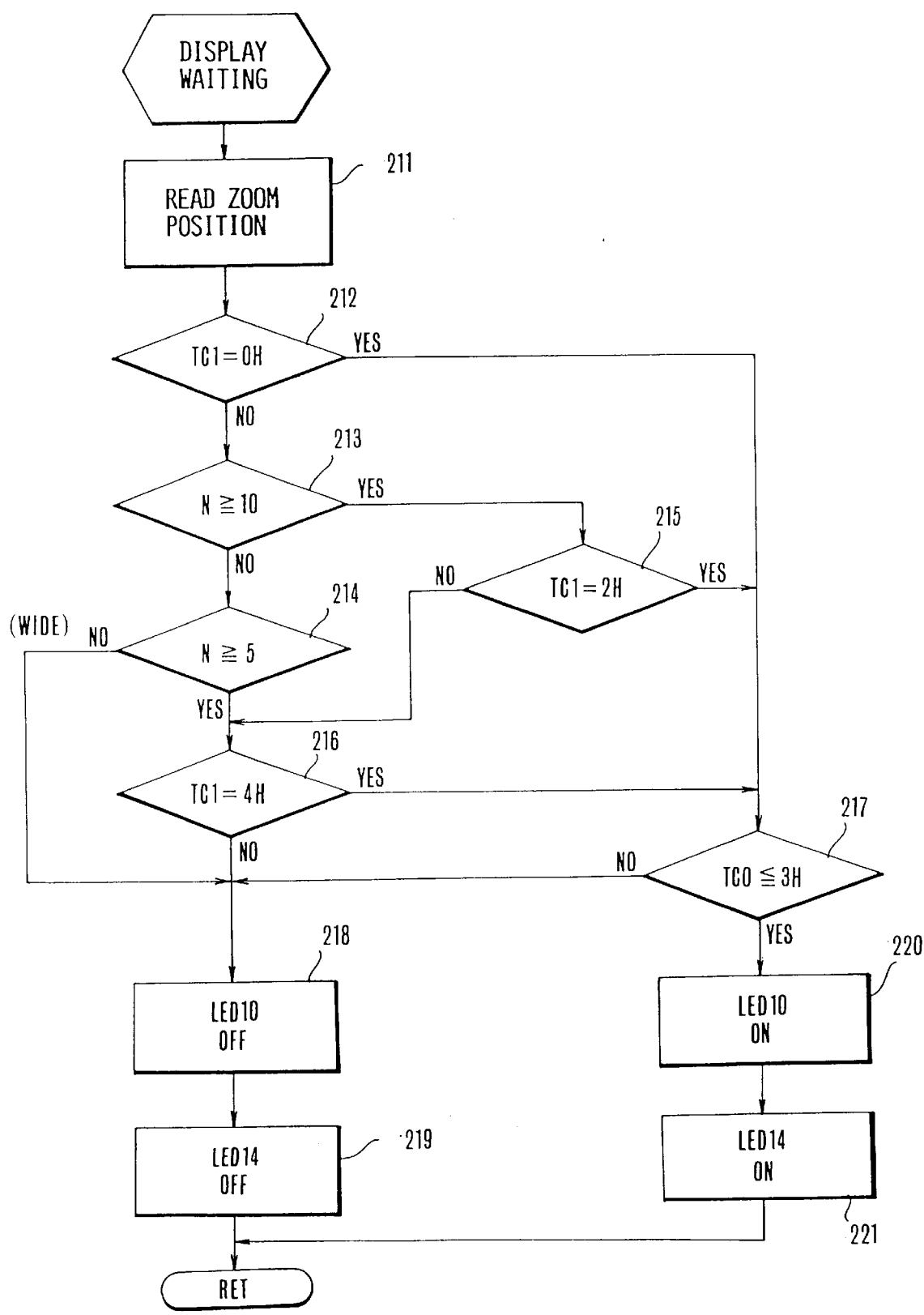
FIG. 19 is a flowchart for another example of an operation of "waiting" display mode in the circuit of FIG. 3.
Figure 20:
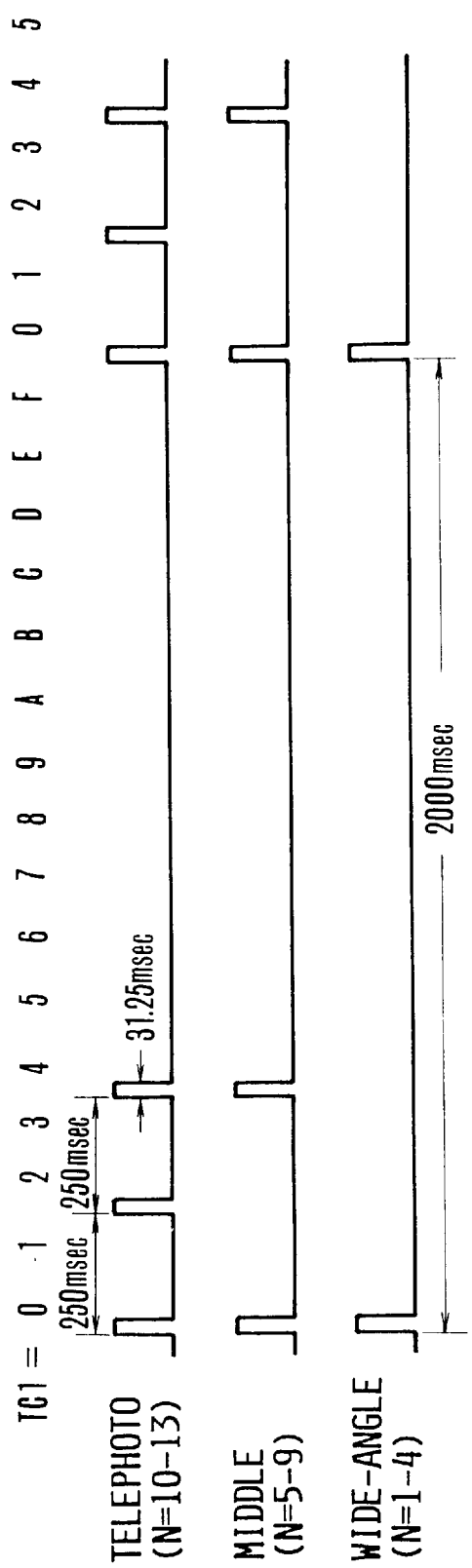
FIG. 20 is a timing chart for the operation of FIG. 19

FIG. 19 is a flowchart illustrating another practical example of the program for display of waiting for remote control in the step #119 of FIG. 4, and FIG. 20 shows the timing in which the remote-control mode display LED 10 and the ready-to-shoot display LED 14 are energized.

In this example, the entire zooming range is divided into three regions, namely, a telephoto region (N=10–13), a middle region (N=5–9) and a wide-angle region (N=1–4), and the number of times the LED for the display of waiting for remote control is on and off is varied to indicate what zooming region the lens 3 lies in.

The program of FIG. 19 is now explained. The timer TC1/TC0 is used in a similar way to that described in connection with FIG. 11. The present zooming position N is read in a step #211. Whether TC1=0H is checked in a step #212. If TC1=0H, the flow advances to a step #217 where whether TC0<3H is checked. If TC0≦3H, the remote-control mode display LED 10 and the ready-to-shoot display LED 14 are energized on in steps #220 and #221 respectively. That is, in the case of TC1/TC0≦03H, these LEDs 10 and 14 are energized on in any zooming position.

In the case of TC1≠0H found in the step #212, the flow advances to a step #213 where whether N≧10 is checked. If N≧10, the flow advances to a step #215 where whether TC1=2H is checked. If TC1=2H, the flow advances to a step #217 where similarly to the above-described case, in the case of 20H≦TC1/TC0≦23H, the remote-control mode display LED 10 and the ready-to-shoot display LED 14 are energized. If not N≧10 in the step #213, the flow advances to a step #214 where whether N≧5 is checked. If not N≧5, or if N≦4, the flow advances to steps #218 and #219 where the LEDs 10 and 14 are deenergized. If N≧5 in the step #214, whether or not TC1=4H is checked in a step #216. Also in the case of not TC1=2H in the step #215, the flow advances to the step #216. If, in the step #216, TC1=4H, the flow advances to the step #217. Therefore, in the case of 40H≦TC1/TC0≦43H, the LEDs 10 and 14 are energized.

Summarizing the foregoing, the time for which the remote-control mode display LED 10 and the ready-to-shoot display LED 14 are energized varies with variation of N as shown in FIG. 20 and as follows:
For the telephoto region of N=10–13, $$00H \leq TC1/TC0 \leq 03H$$

$$20H \leq TC1/TC0 \leq 23H$$

$$40H \leq TC1/TC0 \leq 43H$$

totaling three times;
For the middle region of N=5–9, $$00H \leq TC1/TC0 \leq 03H$$

$$40H \leq TC1/TC0 \leq 43H$$

totaling two times;
For the wide-angle region of N=1–4, $$00H \leq TC1/TC0 \leq 03H$$

totaling one time.

In such a manner as has been described above, depending on the zooming region, the number of times the display of waiting for remote control is presented intermittently varies, thereby making it possible for the operator to easily confirm what zooming position the lens 3 is taking at the present time even from afar.

Figure 22:
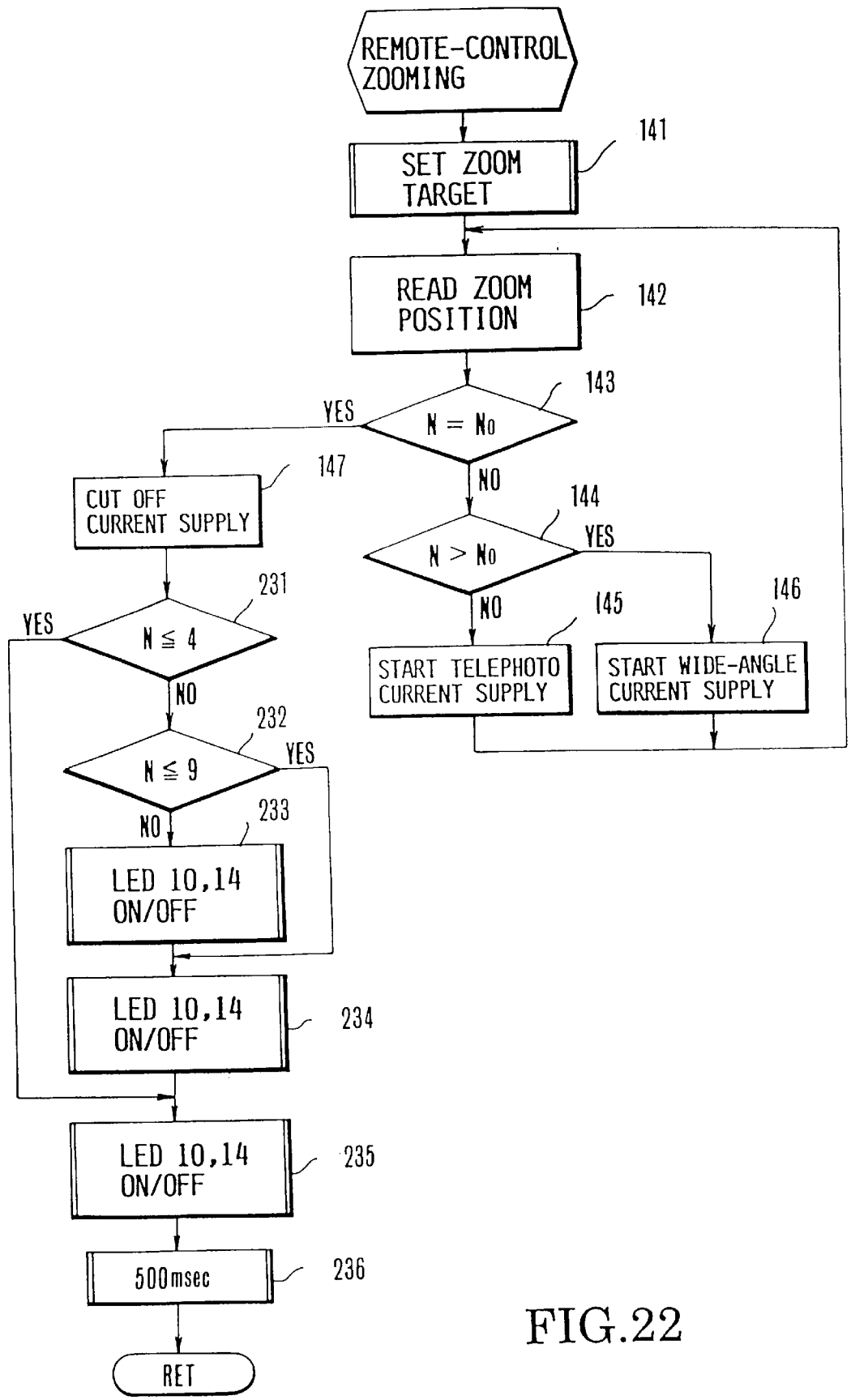
Figure 23:
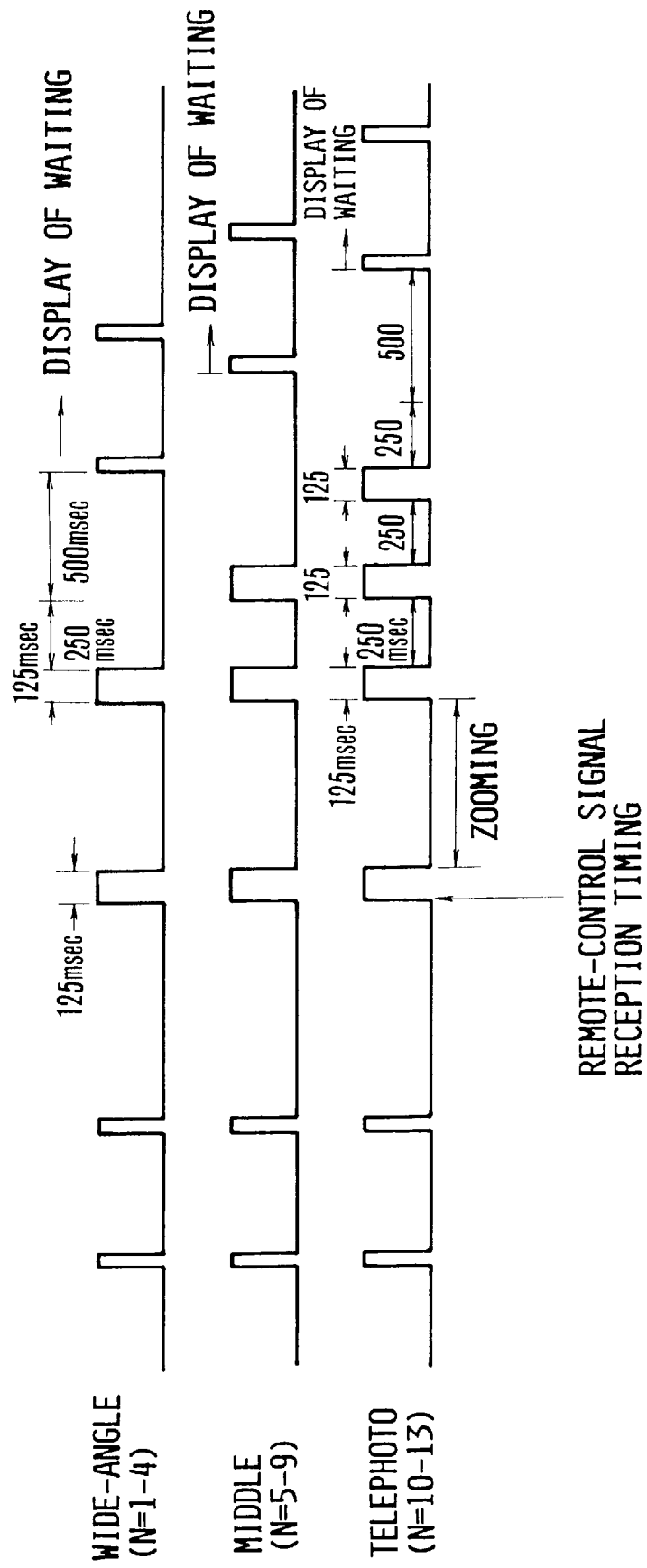
FIG. 23 is a timing chart for the operation FIG. 21.

Though, in the example of FIG. 19 and FIG. 20, the zooming position taken before the remote-control zooming has been displayed by using the display of waiting, there is another method of displaying it after the remote-control zooming has been completed. This is shown in FIG. 21 to FIG. 23.

Figure 21:
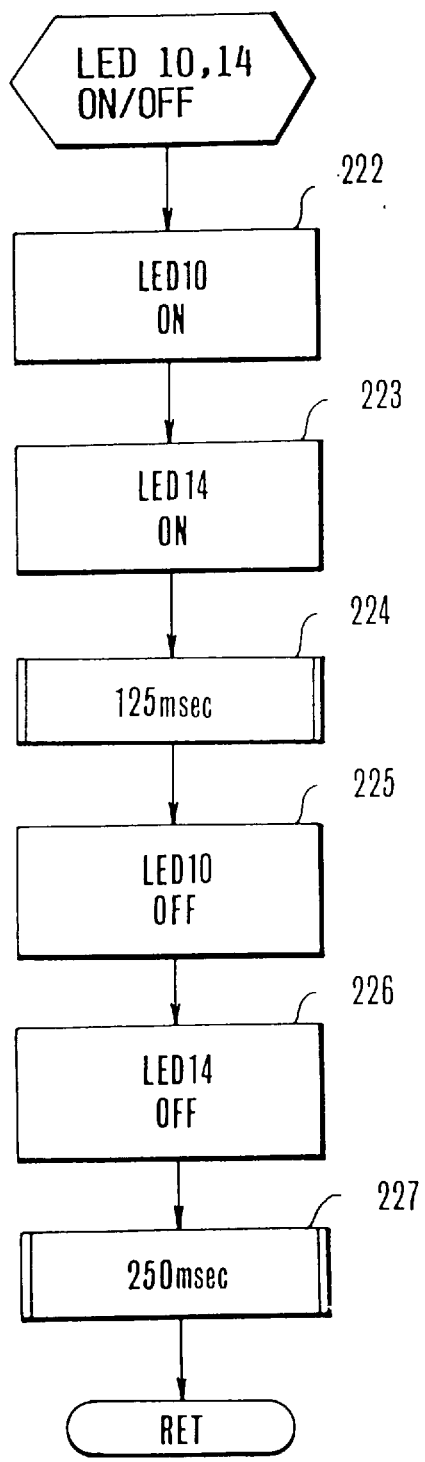
FIG. 21 and FIG. 22 are flowcharts for another example of an operation of displaying the zoom position in the circuit of FIG. 3.

Referring first to FIG. 21, a subroutine program for energizing the remote-control mode display LED 10 and the ready-to-shoot display LED 14 is described.

A step #222 energized the remote-control mode display LED 10, another step #223 lights on the ready-to-shoot display LED 14, and another step #224 waits 125 msec. This time space of 125 msec. is created in a similar way to that described in connection with the steps #173 and #174 of FIG. 13. When 125 msec. has passed, the LED 10 is deenergized in a step #225, and then the LED 14 in a step #226. In a step #227 another time of 250 msec. is waited before the return to the original program occurs.

Next, the zooming position display is described.

Referring to FIG. 4, when the remote-control zooming signal is received, the flow advances to the steps: #118→#120→#121→#122 →#123, thus entering the remote-control zooming program. Though, in the preceding embodiment, the execution of the remote-control zooming program of FIG. 9 has been immediately followed by the return to the step #123, in this embodiment after the remote-control zooming, displaying of the zooming position is carried out. This is shown in FIG. 22.

Similarly to FIG. 9, steps #141 to #147 of FIG. 22 are executed to do zooming until the predetermined zooming position. The flow then advances to a step #231. In the step #231, whether the zooming position N is below "4" is checked. If this results in finding N≦4, the flow advances to a step #235 where the remote-control mode display LED 10 and the ready-to-shoot display LED 14 are turned on/off, that is, the program of FIG. 21 is executed. The flow then advances to a step #236 for waiting 500 msec. and returns to the step #123 of FIG. 4.

If, in the aforesaid step #231, not N≦4, the flow advances to a step #232. If N≦9, the flow advances to a step #234. If not so, or in the case of N≧10, the program of FIG. 21 is executed three times in steps #233, #234 and #235. After having waited 500 msec. in the step #236, the flow returns to the step #123 of FIG. 4. In the case of N≦9, that is, by combination with the condition of the step #231, in the case of 5≦N≦9, the program of FIG. 21 is executed two times in steps #234 and #235. After this, the flow advances to a step #236.

Summarizing the foregoing, after the remote-control zooming power supply, depending on the zooming position, the remote-control mode display LED 10 and the ready-to-shoot display LED 14 are energized as follows:

$$N=1-4 \rightarrow 1 \text{ time}$$

$$N=5-9 \rightarrow 2 \text{ times}$$

$$N=10-13 \rightarrow 3 \text{ times}$$

This timing is shown in FIG. 23.

The reason why after the intermittent lightings, a time space of 500 msec. is used is to make it possible to distinguish the intermittent lighting for the display of end of remote-control zooming and the intermittent lighting for the display of waiting for remote control from each other.

Also, the display of FIG. 21 to FIG. 23 can be set independently of the display of FIG. 19 and FIG. 20. Therefore, both displays can be used. That is, after each of the event of the display of waiting and the event of remote-control zooming, the zooming position can be made to display.

FIG. 24 to FIGS. 27(a), 27(b) and 27(c) show another embodiment of the invention where the similar constituent parts to those of the before-described embodiments are denoted by the same reference numerals, and only different points are described.

Figure 24:
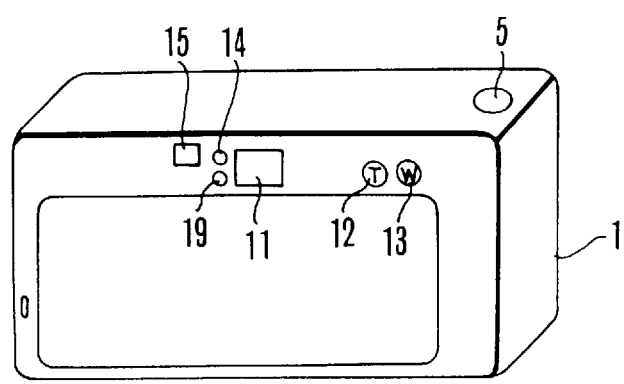
FIG. 24 is a back view of another embodiment of a camera capable of remote-control operation with an electronic flash device built therein according to the invention.

FIG. 24 is a back view of the camera. This camera is of the built-in electronic flash device type and is capable of remote-control operations. On its back side, besides the ready-to-shoot display LED 14 in the neighborhood of the finder eyepiece window 11, there is provided a display LED 19 for the purpose of presenting a flash device charge completion display or a camera-shake warning display. Usually the LED 14 emits green light, and this LED 19 emits red light.

Figure 25:
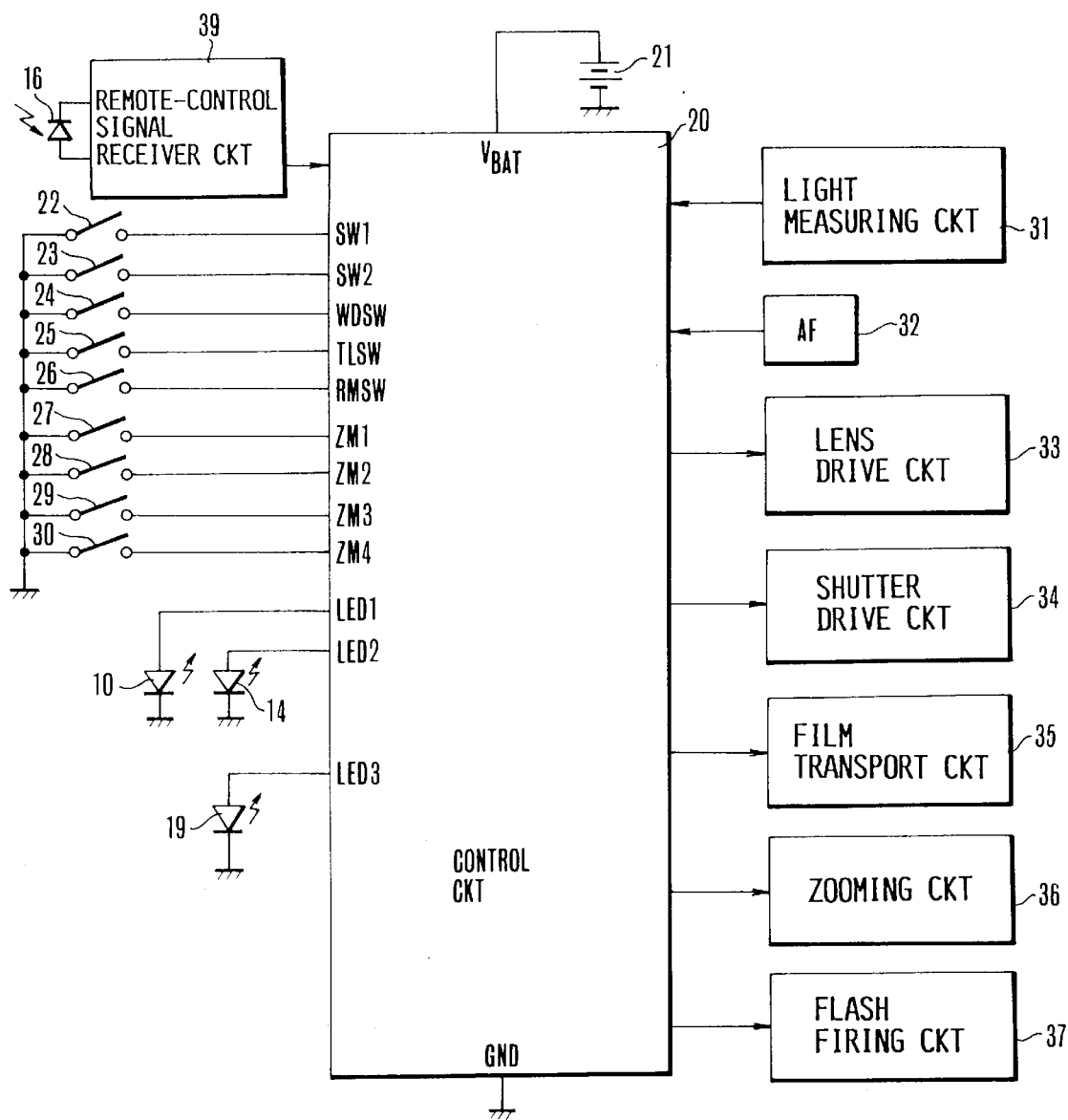
FIG. 25 is a block diagram of the circuitry of the camera of FIG. 24.

FIG. 25 is a block diagram of an electric circuit for its operation as obtained by adding to the control circuit 20 the flash device charge completion display LED 19 and a flash firing circuit 37.

The timing in which these LEDs 14 and 19 are energized lies in the steps #109 to #112 of the flowchart of FIG. 4. When the flow advances to the step #113 for actuating a camera release, or when the release button is freed and the flow advances to the step #117, they are lighted off. Here, the ready-to-shoot display LED 14 is always energized during the steps #109 to #112, while the flash device charge completion display LED 19 is energized only during the time when a flash exposure is made.

Figure 26A:
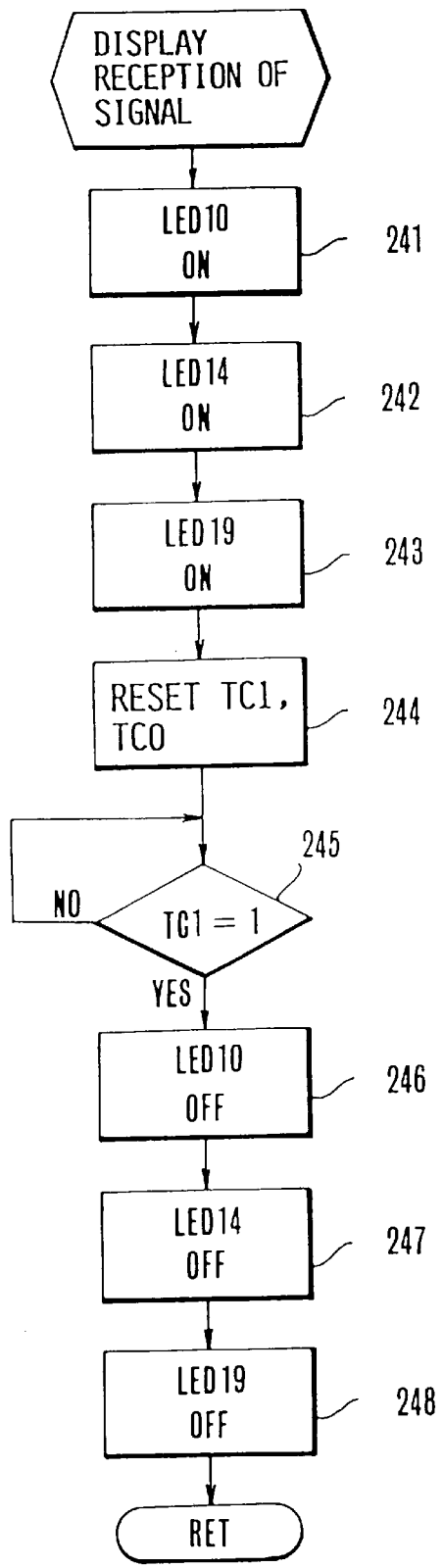
FIG. 26(a), 26(b) and 26(c) are flowcharts for operations of the circuit of FIG. 25 in displaying the receipt of a remote-control signal.
Figure 26B:
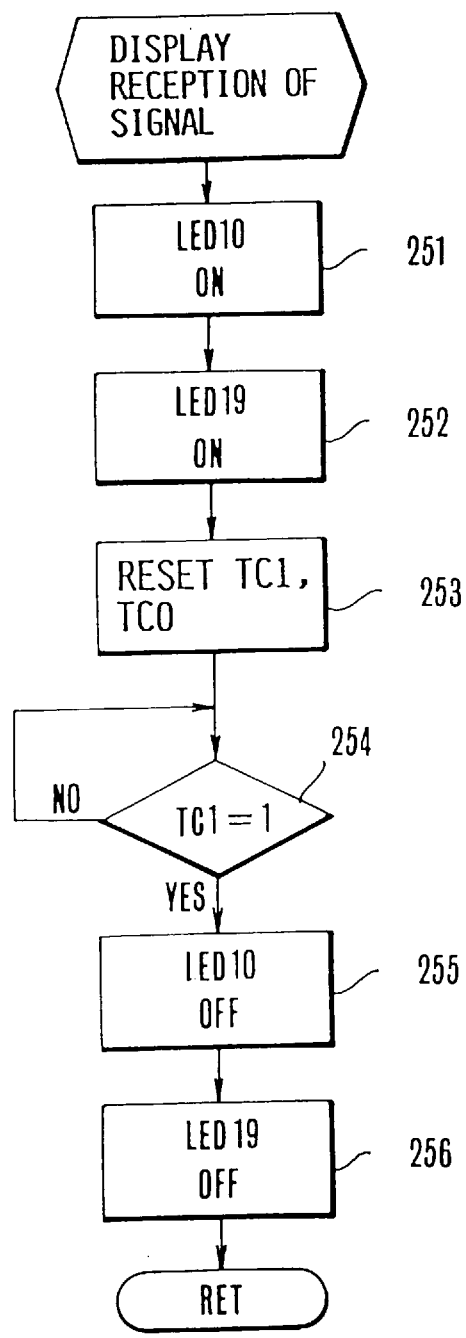
Figure 26C:
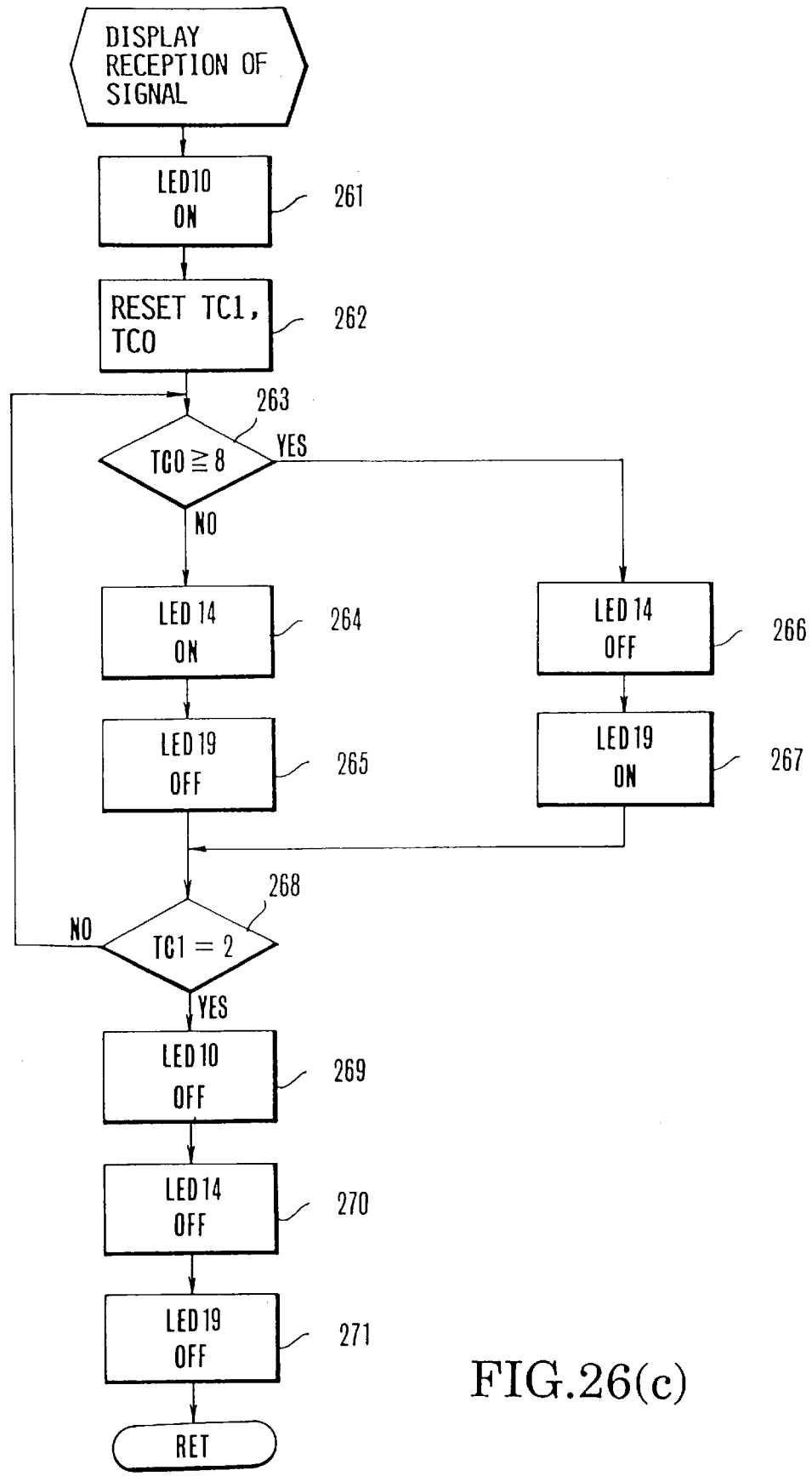
Figure 27A:
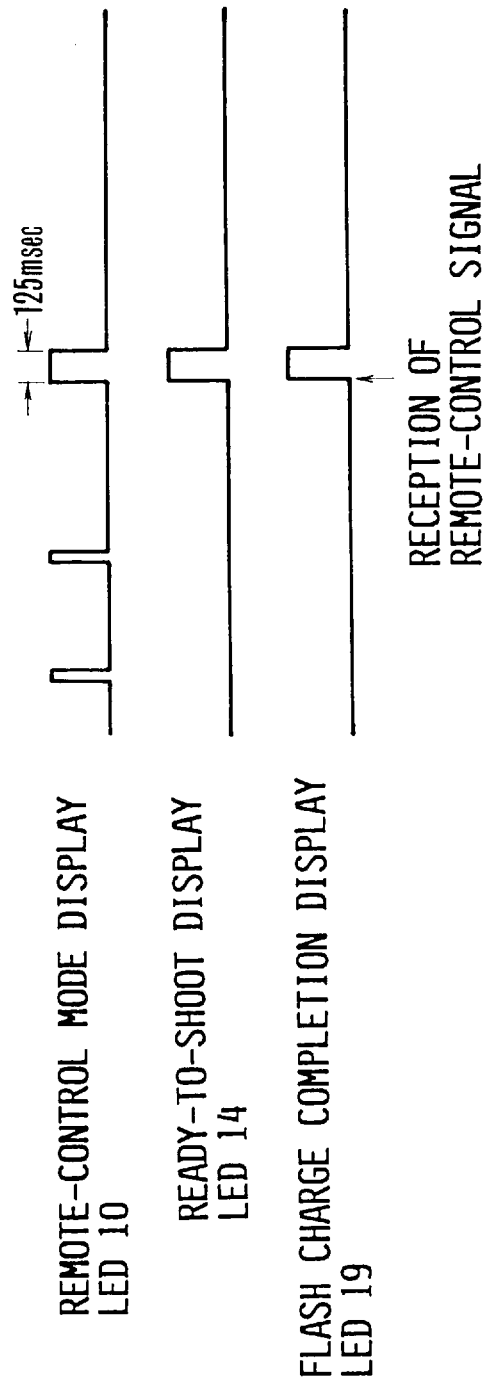
Figure 27B:
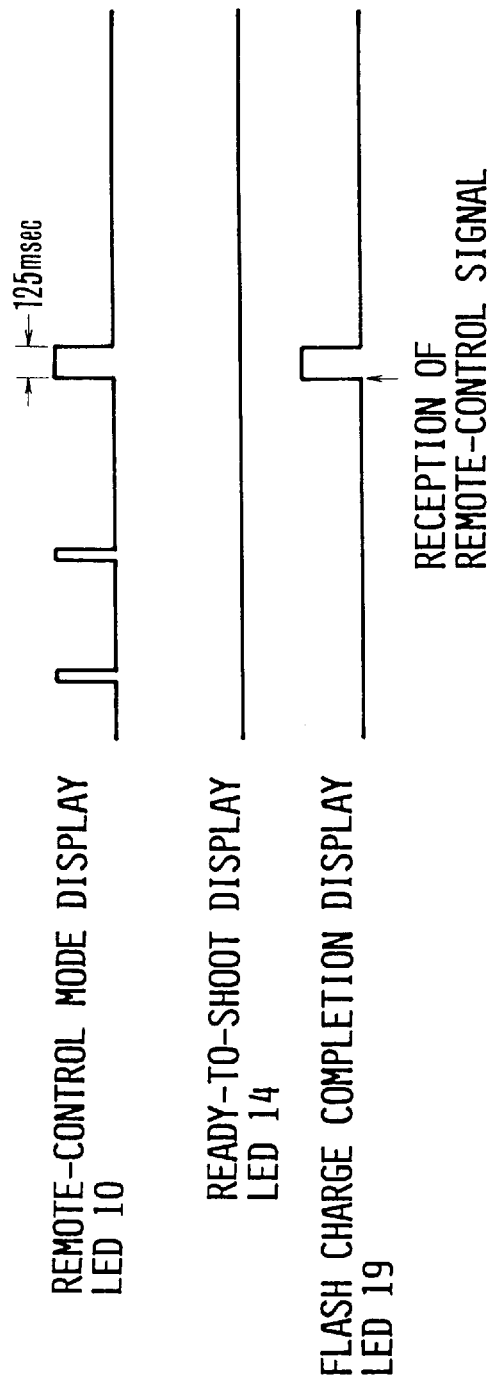

And, in the present embodiment, a program for displaying the reception of the remote-control signal operates as shown in FIG. 26(a) to 26(c), and the corresponding received signal displays are presented in such timing as shown in FIG. 27(a) to 27(c).

Referring first to FIG. 26(a), the remote-control mode display LED 10 is energized in a step #241, the ready-to-shoot display LED 14 in a step #242, and the flash device charge completion display LED 19 in a step #243. Steps #244 and #245 wait 125 msec., and steps #246 to #248 deenergized the respective LEDs in such timing as shown in FIG. 27(a). Because the two LEDs 14 and 19 near the finder eyepiece window 11 are energized at the same time, it is easy to confirm.

Also, in FIG. 26(b), the remote-control mode display LED 10 is lighted on in a step #251, the flash device charge completion display LED 19 in a step #252. Steps #253 and #254 wait 125 msec. Steps #255 and #256 deenergized the respective LEDs in such timing as shown in FIG. 27(b). The ready-to-shoot display LED 14 near the finder eyepiece window 11 is not energized, and only the flash device charge completion display LED 19 is not energized. In this case, the camera release is not actuated in the usual way by the release button. Therefore, a special display appears, drawing attention of the sense of the operator.

Further, in FIG. 26(c) there is shown a case where the LEDs 14 and 19 near the finder eyepiece window 11 is alternately energized.

The remote-control mode display LED 10 are energized in a step #261, and the TC1 and TC0 are reset in a step 262. Whether the TC0 is above 8H is checked in a step #263. If above 8H, the flow advances to a step #266 for deenergizing the LED 14 and therefrom to a step #267 for energizing the LED 19. If the TC1 is below 8H, the LED 14 is energized in a step #264, and the LED 19 is deenergized in a step #265. In either case, the flow advances to a step #268 where whether the TC1 has become 2H is checked. If the TC1 is not 2H, the flow returns to the step #263, thus forming a loop. If the TC1 becomes 2H, the LEDs 10, 14 and 19 are deenergized in steps #269 to #271.

In the loop of the steps #263 to #268, for the periods of $00H \leq TC1/TC0 < 08H \rightarrow 0 \leq T < 62.5$ msec.

$10H \leq TC1/TC0 < 18H \rightarrow 125.0 \leq T < 187.5$ msec.

only the ready-to-shoot display LED 14 is as the flow passes through the steps #268–#265; for the periods of $08H \leq TC1/TC0 < 10H \rightarrow 62.5 \leq T < 125.0$ msec.

$18H \leq TC1/TC0 < 20H \rightarrow 187.5 \leq T < 250.0$ msec.

only the flash device charge completion display LED 19 is energized as the flow passes through the steps #266–#267.

This results in alternate lighting of the two LEDs 14 and 19 as shown in FIG. 27(c), thus presenting an unusual display which will draw attention of the operator.

By changing the selection of one or two of the LEDs to be energized and its timing in such a way as shown above, various displays can be presented. Also, if a complicated timing of light emission is made, an increase of the program capacity the display program necessitates will result. Therefore, by taking into account the relationship with the usual ready-to-shoot display states, a timing which permits the display to stand out clearly and the program capacity to be minimized may be chosen.

It is to be noted that though, in the embodiment of FIG. 15, the zooming range has been divided into three regions, this number may otherwise be decreased to "2" or less, or increased to "4" or more.

Further, though in the embodiment of FIG. 21 to FIG. 23, the zoom position display has been done after the end of the remote-control zooming, it is also possible to carry out this display before the remote-control zooming current is supplied. In this case, it is better understood to display the value of $N_0$ or the zooming target than to display the present zooming position N.

Also, though, in the embodiment of FIG. 19 to FIG. 23, the number of times the energizing of the LED is recycled has been changed depending on the zoom position, the zooming position display may otherwise be done by changing the period of energization of the display.

Also, it is needless to say that even if the display of the above-described embodiment employs other display means than the LEDs, the present invention can be applied.

Also, though, in the foregoing embodiments, the camera of the type in which the zooming is carried out on the basis of the zooming signal from the remote-control transmitter has been shown, the present invention can be applied to another type of camera in which the zooming can be done on the camera side alone.

Also, though, in the foregoing embodiments, the photographic optical system has been the zoom lens, the invention can advantageously be applied to any other types of optical systems in which the magnification is varied stepwise, or not varied at all.

According to the foregoing embodiments, for one time of reception of the remote-control zooming signal, zooming is performed either by a predetermined amount which is a relatively large zooming change, or by moving the zoom lens to a predetermined zooming position. Therefore, a remote-control zooming camera which is easy to confirm the zooming position, does not involve a large increase of the size of the camera housing, and is comfortable to use, can be realized.

Also, even when the remote-control transmitter is constructed, the addition of at least one sending signal to the remote-control release signal suffices for carrying out remote-control zooming. Therefore, there is no need to increase the size of that transmitter. Also, the sending signal is not required to be a continuous signal of so long a width as to be equal to the zooming time. The sending signal may be in the pulsated form. This means that the energy of sending the signal can be minimized, and a battery of large capacity is not required to use. So, this is advantageous for minimizing the size of the transmitter.

Also, according to the foregoing embodiment, either or both of before and after the remote-control zooming is carried out, the zooming position at the given time is detected and this position is displayed by varying the display form of the LED. Therefore, even from a position remote from the camera, the present zooming position can be confirmed with ease. By this, the display is made very advantageous when a camera whose zooming is carried out by the remote-control is realized.

Also, in the above-described embodiments, the LED to be used in the "waiting" display for the remote-control is used in common with the display means for confirming the zooming position. Therefore, there is no need to add new display means for confirming the zooming position.

Also, in the embodiment of FIG. 21 to FIG. 23, as soon as the remote-control zooming has been done, the display is presented. Therefore, it is possible to confirm also an additional situation that the remote-control zooming has been down without failure. Further, the interval of the intermittent lighting can be extended. Therefore, it is easy to confirm.

According to the foregoing embodiments, when the remote-control signal is received, not only the remote-control mode display LED, but also light-emitting elements for displaying the operating states of the camera, for example, the ready-to-shoot state, the flash device charge completion state, and the camera-shake warning, are energized continuously or intermittently in the neighborhood of the finder eyepiece window, thereby giving an advantage that even if the remote-control transmitter is used like a cable release just behind the back of the camera, the occurrence of the remote-control release actuation can be confirmed easily and reliably without having to increase the production cost.

Also, depending on the timing in which the aforesaid light emitting elements for display are energized and the combination of the selected one or ones of them to be energized, the display can be made something unlike shots being taken in the usual way by the release button. Therefore, it is made possible to clearly distinguish the reception of the remote-control signal from other information.

What is claimed is:

1. A camera capable of remote-control operations, comprising:
    (A) signal receiving means for receiving a remote-control signal;
    (B) magnification altering means for altering a magnification of an optical system; and
    (C) a control circuit which causes the magnification altering means to operate in response to the remote-control signal received by the signal receiving means, and causes the magnification altering means to continuously operate until the optical system reaches a predetermined magnification state even if the signal receiving means stops receiving the remote-control signal while the magnification state of the optical system is still being altered by the operation of the magnification altering means.

2. A camera according to claim 1, further comprising detecting means for detecting the magnification state of the optical system.

3. A camera according to claim 2, wherein said control circuit causes the magnification altering means to operate until the magnification state of the optical system reaches the predetermined magnification state in view of the magnification state detected by the detecting means.

4. A camera according to claim 3, wherein said control circuit includes means for skippingly selecting magnification states accessible by said optical system and altering one of said skippingly selected magnification states to said predetermined magnification state on the basis of the magnification state detected by said detection means.

5. A camera according to claim 1, further comprising:
    display means for displaying said predetermined magnification state of said optical system outside of said camera,
    said display means varying the display form in accordance with a magnification of said predetermined magnification state.

6. A camera according to claim 5, wherein said display means includes means for display behind said camera.

7. A camera capable of remote-control operation, comprising:
    (A) magnification altering means for altering a magnification of an optical system;
    (B) an operation member; and
    (C) a control circuit having a first mode in which the control circuit causes the magnification altering means to operate by the operation of the operation member to alter the magnification of the optical system with an altering unit of a predetermined step, and a second mode in which the control circuit causes the magnification altering means to operate in association with a reception of a remote-control signal to alter the magnification of the optical system with an altering unit of a step larger than the predetermined step in the first mode.

8. A camera capable of remote-control operation, comprising:
    (A) magnification altering means for altering a magnification of an optical system;
    (B) an operation member; and
    (C) a control circuit having a first mode in which the control circuit causes the magnification altering means to operate by the operation of the operation member to continuously alter the magnification of the optical system, and a second mode in which the control circuit causes the magnification of the optical system to be altered by a predetermined step in association with a reception of the remote-control signal.

9. A camera according to claim 7, wherein said control circuit causes the magnification of the optical system to be altered by the predetermined step for every reception of the remote-control signal in the second mode.

10. A camera according to claim 8, wherein said control circuit causes the magnification of the optical system to alter by the predetermined step every reception of the remote-control signal in the second mode.

11. A camera comprising:
    a camera body having a front panel and a rear panel which is situated opposite the front panel, said front panel facing toward an object when the object is being photographed with the camera,
    a signal receiving window for receiving a wireless remote control signal provided on said rear panel of the camera body and
    a control device for controlling an operation of the camera according to the wireless remote-control signal received by the signal receiving window.

12. A camera according to claim 11, wherein said control device includes means for performing a display related to the remote-control before a photographing operation according to the remote-control.

13. A camera according to claim 11, wherein said control device includes means for displaying that the camera is subjected to the remote-control.

14. A camera according to claim 13, wherein said control device includes means for displaying that the camera performs a photograph in accordance with the remote-control.

15. A camera according to claim 11, wherein said control device includes means for performing a display related to the remote-control irrespective of whether or not a photographing mode of the camera as set up is involved in flash photographing.

16. A camera according to claim 11, wherein said control device includes means for performing a display related to a remote control operation of the camera according to the remote control signal received by said signal receiving window.

17. A camera according to claim 16, wherein said signal receiving window includes means for performing display of receipt of the remote-control signal.

18. A camera according to claim 14 wherein said control device includes a display means provided on said rear panel.

19. A remote control device adaptable to a camera having a camera body with a front panel and a rear panel, the front panel facing an object when the object is being photographed with the camera, comprising:

a signal receiving window for receiving a wireless remote control signal provided on said rear panel of the camera body, and a control device for controlling operation of the camera according to the wireless remote-control signal received by the signal receiving window.

20. A device according to claim 19, wherein said control device includes means for performing a display related to the remote-control before a photographing operation according to the remote-control.

21. A device according to claim 19, wherein said control device includes means for performing a display related to a remote control operation of the camera according to the remote control signal received by said signal receiving window.

22. A device according to claim 19, wherein said signal receiving window includes means for performing display of receipt of the remote-control signal.

23. An apparatus applicable to an optical apparatus having an optical member movable to vary a focal length, comprising:

a control device for moving the optical member selectively in a first movement manner and in a second movement manner different from the first movement manner, said control device moves the optical member by a first step as a minimum movement width in the first movement manner, and moves the optical member by a second step width as a minimum movement width which is different from the first step width in the second movement manner, and change-over means for changing over between the first and second movement manners to move the optical member according to whether the optical member changes the focal length according to an operation of an operation member provided in the optical apparatus or according to a wireless remote control signal.

24. An apparatus according to claim 23, wherein said control device uses as the minimum driving width in the second movement manner a second step which is larger than the first step in the first movement manner and the change-over means includes means for selecting the first movement manner when the focal length is changed according to the operation of the operation member, and selecting the second movement manner when the focal length is changed according to the wireless remote control signal.

25. An apparatus according to claim 23, wherein said control device includes means for using as the minimum movement width in the second movement manner a second step of width equal to plural times the first step in the first movement manner.

26. An apparatus according to claim 23, wherein the change-over means is switchable at least between a first mode corresponding to said first movement manner to move the optical member according to the operation of the operation member and a second mode corresponding to the second movement manner to move the optical member according to the wireless remote control signal and the control device includes means for setting the first movement mode according to the setting of the optical apparatus to the first mode and setting the second movement mode according to the setting of the optical apparatus to the second mode.

27. An apparatus according to claim 23, wherein the optical member includes a lens.

28. An optical apparatus comprising:

an optical member movable to vary a focal length, and a control device for moving the optical member selectively in a first movement manner and in a second movement manner different from the first movement manner, said control device moves the optical member by a first step as a minimum movement width in the first movement manner, and moves the optical member by a second step width as a minimum movement width which is different from the first step width in the second movement manner, and change-over means for changing over between the first and second movement manners to move the optical member according to whether the optical member changes the focal length according to an operation of an operation member provided in the optical apparatus or according to a wireless remote control signal.

29. A camera usable with an optical apparatus having an optical member to movably vary a focal length, comprising:

a control device for moving the optical member selectively in a first movement manner and in a second movement manner different from the first movement manner, said control device moves the optical member by a first step as a minimum movement width in the first movement manner, and moves the optical member by a second step width as a minimum movement width which is different from the first step width in the second movement manner, and change-over means for changing over between the first and second movement manners to move the optical member according to whether the optical member changes the focal length according to an operation of an operation member provided in the optical apparatus or according to a wireless remote control signal.

* * * * *

UNITED STATES PATENT AND TRADEMARK OFFICE
CERTIFICATE OF CORRECTION

PATENT NO. : 5,826,116
DATED : October 20, 1998
INVENTOR(S) : Yoshiyuki Kaneko

It is certified that error appears in the above-identified patent and that said Letters Patent is hereby corrected as shown below:

Column 2, line 61, after "circuit" insert --when--.
Column 3, 10, after "19" insert --.--.
Column 3, line 14, after "operation" insert --of--.
Column 4, line 43, after "#104→" delete "#→101" and insert --→#101--.
Column 5, line 47, delete "waited for" and insert --awaited--.
Column 8, line 20, after "165" insert --)--.
Column 8, line 37, delete "deener-" and insert --ener- --.
Column 8, line 38, delete "lighted off" and insert --deenergized--.
Column 9, line 54, before "13" (second occurrence), insert --≦--.
Column 11, line 46, delete "lights on" and insert --energized--.
Column 12, line 18, delete "supply" and insert --supplied--.
Column 13, line 14, delete "lighted on" and insert --energized--.

Signed and Sealed this

Thirteenth Day of July, 1999

Attest:

Q. TODD DICKINSON

Attesting Officer

Acting Commissioner of Patents and Trademarks

UNITED STATES PATENT AND TRADEMARK OFFICE
CERTIFICATE OF CORRECTION

PATENT NO. : 5,826,116
DATED : October 20, 1998
INVENTOR(S) : Yoshiyuki Kaneko

It is certified that error appears in the above-identified patent and that said Letters Patent is hereby corrected as shown below:

Title page, col. 1, after item [22] insert
   [30] Foreign Application Priority Data
      Feb. 28, 1989 [JP]    Japan .................. 1-045114
      Apr. 27, 1989 [JP]    Japan .................. 1-105957
      Apr. 27, 1989 [JP]    Japan .................. 1-105958

Signed and Sealed this

Second Day of May, 2000

Attest:

Q. TODD DICKINSON

*Attesting Officer*            *Director of Patents and Trademarks*